(12) United States Patent
Shiraishi et al.

(10) Patent No.: US 7,079,597 B1
(45) Date of Patent: Jul. 18, 2006

(54) METHOD AND CIRCUIT FOR ACQUISITION

(75) Inventors: Kenichi Shiraishi, Yokohama (JP); Akihiro Horii, Zama (JP); Shoji Matsuda, Kawasaki (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 678 days.

(21) Appl. No.: 10/049,808

(22) PCT Filed: Oct. 2, 2000

(86) PCT No.: PCT/JP00/06838

§ 371 (c)(1),
(2), (4) Date: Feb. 19, 2002

(87) PCT Pub. No.: WO01/26315

PCT Pub. Date: Apr. 12, 2001

(30) Foreign Application Priority Data

Oct. 5, 1999 (JP) ................................. 11-284214

(51) Int. Cl.
*H04L 27/16* (2006.01)
*H04L 7/00* (2006.01)
*H04J 3/06* (2006.01)

(52) U.S. Cl. ........................ 375/326; 375/368; 370/509
(58) Field of Classification Search ................ 375/326, 375/355, 354, 340, 316, 279–281, 261, 330, 375/331, 362–368; 370/509, 503, 510–514; 329/304, 306
See application file for complete search history.

(56) References Cited

U.S. PATENT DOCUMENTS 5,251,210 A * 10/1993 Mann et al. ................. 370/519
5,953,649 A *  9/1999 Junell ....................... 455/67.11

FOREIGN PATENT DOCUMENTS

| JP | 06-46094 | 2/1994 |
|----|----------|--------|
| JP | 07-65513 | 3/1995 |
| JP | 10-4439  | 1/1998 |

* cited by examiner

*Primary Examiner*—Tesfaldet Bocure
(74) *Attorney, Agent, or Firm*—Eric J. Robinson; Robinson Intellectual Property Law Office, P.C.

(57) ABSTRACT

Frame synchronization is quickly established to acquire an RF channel in a short time. Numerically controlled oscillators 1-1 to 1-3, complex calculation circuits 2-1 to 2-3, band limit filters 3-1 to 3-3, a selector 7, a phase error detection circuit 9, a loop filter 10, and an AFC circuit 11 compose a carrier regeneration loop for removing the frequency error of the carrier included in an in-phase component I and a quadrant component Q of the baseband signal input to the complex calculation circuits 2-1 to 2-3. A timing generator 6 detects which of frame synchronization pattern detection circuits 5-1 to 5-3 has detected a frame synchronization pattern, provides the selector 7 with a selection signal corresponding to the decision result, and sends a switch signal to the AFC circuit 11. Thereafter, the carrier for removing the frequency error included in the baseband signal is regenerated to acquire an RF channel in a short time.

13 Claims, 15 Drawing Sheets

FIG. 2
(a)
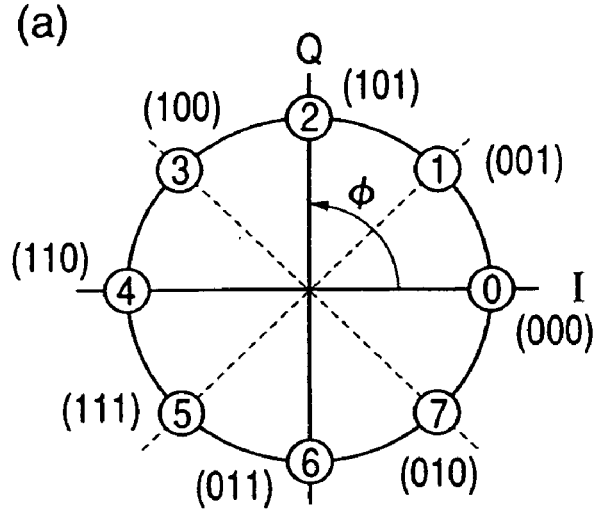
(b)
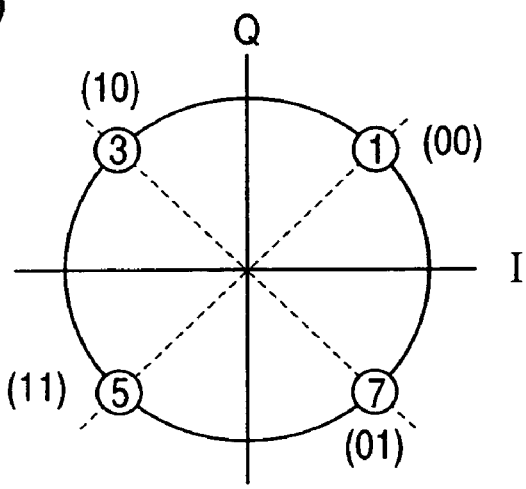
(c)
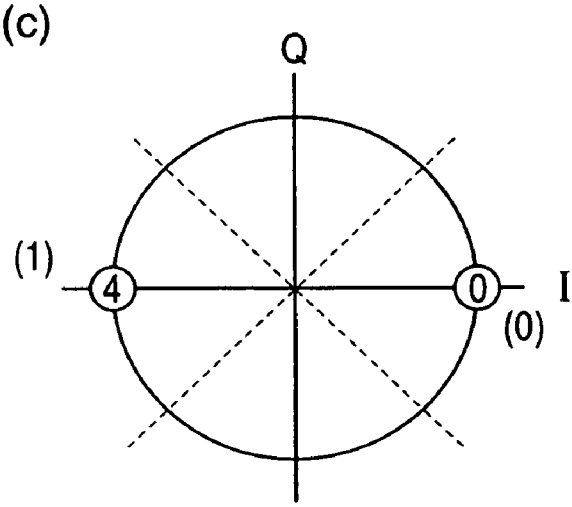

METHOD AND CIRCUIT FOR ACQUISITION

FIELD OF THE INVENTION

The present invention relates to a synchronization acquiring circuit for acquiring an RF channel, and more particularly to a synchronization acquiring circuit capable of acquiring an RF channel in a short time.

RELATED ART

In receiving digital broadcasting of a broadcasting satellite (BS), a synchronization acquiring circuit such as shown in FIG. 15 is used to establish a synchronization and acquire a radio frequency (RF) channel of a predetermined frequency.

In BS digital broadcasting, a digital signal is transmitted in the frame which is time divisionally divided and multiplexed by various digital modulation methods. In order to acquire an RF channel, it is necessary to detect a frame synchronization pattern and establish a synchronization.

The frame synchronization pattern is formed by a digital signal of symbols transmitted by a BPSK modulation method. In the synchronization acquiring circuit shown in FIG. 15, a BPSK demapper 73 recovers the digital signal and a frame synchronization pattern detection circuit 74 detects a predetermined frame synchronization pattern.

The BPSK demapper 73 specifies a signal point position on an I-Q vector plane in accordance with the in-phase component I and a quadrature-phase component Q of a baseband signal, and specifies the value (0 or 1) of the digital signal in accordance with the phase obtained from the signal point.

For example, the BPSK demapper 73 specifies the digital signal value as "1" if the signal point is in the hatched line area of an I-Q vector plane shown in FIG. 16, and as "0" if it is in the white area of the I-Q vector plane. Namely, depending upon whether the signal point representative of the phase of a received signal is in which one of the two areas of the I-Q vector plane divided by a BPSK decision criterion border line BL, the BPSK demapper 73 specifies the value of the transmitted digital signal.

In receiving BS digital broadcasting, an outdoor unit (ODU) first down-converts a received radio wave into a broadcasting satellite—intermediate frequency (BS-IF) signal as an intermediate frequency signal.

This BS-IF signal is quasi-synchronization detected by using a local oscillation signal having a fixed frequency to obtain a baseband signal.

Since the local oscillation signal used for quasi-synchronization detection has a fixed frequency, a frequency error generated during down-converting by ODU appears in the BS-IF signal and also in the baseband signal.

In the synchronization acquiring circuit, frequency synchronization for regenerating the carrier is not performed when the frame synchronization pattern is to be detected.

Therefore, in detecting the frame synchronization pattern, the signal point of each symbol on the I-Q vector plane specified by the BPSK demapper 73 from the baseband signal moves on the I-Q vector plane along the rotation direction. Namely, the phase angle of the received signal changes and a phase rotation occurs.

For example, the position of a signal point assigned a bit "1" on the transmission side moves on the I-Q vector plane along the rotation direction as shown in FIG. 17, while symbols of the frame synchronization pattern of 20 bits are received.

In order to correctly detect the frame synchronization pattern from the baseband signal containing such a frequency error, it is required that the signal point assigned a predetermined digital signal value ("0" or "1") on the transmission side does not ride across the BPSK decision criterion border line BL of the I-Q vector plane, while the symbols constituting the frame synchronization pattern are received on the reception side.

In the case wherein the signal point assigned a predetermined digital signal value ("0" or "1") on the transmission side rides across the BPSK decision criterion border line BL of the I-Q vector plane on the reception side, although the BPSK demapper 73 converts the digital signal value into an inverted value, the frame synchronization pattern cannot be detected correctly.

In the above-described synchronization acquiring circuit, the BPSK demapper specifies the position of a signal point on the I-Q vector plane having the fixed BPSK decision criterion border line BL to recover the digital signal.

There is known a synchronization acquiring circuit which can use the transmission method for the BS digital broadcasting and can correctly detect the frame synchronization pattern even if the baseband signal has a phase error, by providing a plurality of BPSK demappers having different positions (rotated phases) of the BPSK judgement criterion border line BL.

Even with such a synchronization acquiring circuit, each BPSK demappter specifies the position of a signal point on one I-Q vector plane having a fixed BPSK judgement criterion border line BL to reproduce the digital signal. Therefore, if the frequency error contained in the baseband signal is larger than a predetermined value, the frame synchronization pattern cannot be detected correctly.

If the BPSK decision criterion border line BL is fixed, the maximum frequency error Δf up to which the signal assigned a predetermined digital signal value (0 or 1) on the transmission side can be received without riding across the BPSK decision criterion border line BL while the reception side receives the symbols representative of the frame synchronization pattern, is obtained by the formula 1:

$$\Delta f = ((\pi/N)/2\pi) \times Fs \quad \text{(Formula 1)}$$

where is a ratio of the circumference of a circle to its diameter, N is the number of symbols of a frame synchronization pattern, and Fs is a symbol rate.

For example, the maximum frequency error capable of correctly receiving a frame synchronization pattern having 20 symbols of BS digital broadcasting at a symbol rate of 28.860 MHz is ±721.5 kHz.

In the BS digital broadcasting, in order to acquire one RF channel, it is necessary to detect the frame synchronization pattern in the range of ±2 MHz of the frequency error contained in the baseband signal.

To this end, in the conventional synchronization acquiring circuit, three types of scanning are required to be sequentially performed by adjusting the output of an AFC circuit 79. The three types of scanning includes: scanning for the detection of a frame synchronization pattern if the frequency error contained in the baseband signal is 0 Hz; scanning for the detection of a frame synchronization pattern if the frequency error is +1.3 MHz; and scanning for the detection of a frame synchronization pattern if the frequency error is −1.3 MHz.

With the conventional synchronization acquiring circuit, the frequency error contained in the baseband signal becomes maximum when a difference between the frequency at which an RF channel is acquired and the frequency of the local oscillator for tuning in at the reception side becomes maximum.

In this case, it is necessary to sequentially execute the three types of scanning so that it takes a long time to acquire an RF channel.

The invention has been made under such a circumstance, and an object of the invention is to provide a synchronization acquiring circuit capable of establishing a synchronization and acquiring a channel in a short time.

DISCLOSURE OF THE INVENTION

In order to achieve the above object, according to a first aspect of the invention, there is provided a synchronization acquiring circuit for receiving a baseband signal transferred as an intermediate frequency signal obtained by down-converting a received radio wave and for acquiring a radio frequency channel, comprising:

a plurality of pattern detection means disposed in parallel each performing an operation of receiving the baseband signal transferred by the intermediate frequency signal in a different frequency range and detecting a predetermined frame synchronization pattern; and carrier recovery means for establishing a frame synchronization and recovering a carrier to be used for removing a frequency error of the baseband signal when one of the plurality of pattern detection means detects the frame synchronization pattern.

More specifically, the synchronization acquiring circuit comprises:

first pattern detection means for receiving the baseband signal transferred by the intermediate frequency signal in a predetermined frequency range and detecting a predetermined frame synchronization pattern;

second pattern detection means for receiving the baseband signal transferred by the intermediate frequency signal in a frequency range higher than the frequency range of the intermediate frequency signal transferring the baseband signal from which the first pattern detection means can detect the frame synchronization pattern, and detecting the predetermined frame synchronization pattern;

third pattern detection means for receiving the baseband signal transferred by the intermediate frequency signal in a frequency range lower than the frequency range of the intermediate frequency signal transferring the baseband signal from which the first pattern detection means can detect the frame synchronization pattern, and detecting the predetermined frame synchronization pattern; and carrier recovery means for establishing a frame synchronization and recovering a carrier to be used for removing a frequency error of the baseband signal when one of the first to third pattern detection means detects the frame synchronization pattern.

It is desired that each of the first to third pattern detection means comprises;

signal conversion means for specifying a phase of the received baseband signal and converting the phase into a digital signal corresponding to the specified phase; and signal decision means for deciding whether the digital signal generated through conversion by the signal conversion means contains the predetermined frame synchronization pattern.

It is possible to detect a frame synchronization pattern transmitted by the phase modulation method such as a BPSK modulation method.

It is desired that:

the signal conversion means has:

eight de-mapping means each for specifying the phase of the baseband signal on a phase plane having a decision criterion border line whose phase is rotated by $\phi=45°\times n$ (where n is an integer of 0 to 7) and obtaining the converted digital signal, the decision criterion border line being used for specifying a value of the converted digital signal corresponding to the specified phase of the baseband signal; and the signal decision means has:

eight sequence decision means for deciding whether each digital signal sequence generated through conversion by each of the eight de-mapping means contains the predetermined frame synchronization pattern; and means for notifying the carrier recovery means of that the frame synchronization pattern was detected, if at least one of the eight sequence decision means decides that the digital signal sequence contains the predetermined frame synchronization pattern.

It is possible to correctly detect a frame synchronization pattern even if a phase error is generated in the baseband signal to be transmitted by the hierarchical transmission method by which data is multiplexed by various modulation methods.

It is desired that:

each of the first to third pattern detection means comprises:

waveform data making means for creating waveform data to be used for rotating a phase of the baseband signal; and complex calculation means for rotating the phase of the baseband signal by executing a complex number calculation between the waveform data created by the waveform making means and the received baseband signal; and the carrier recovery means comprises:

identification means for identifying one of the first to third pattern detection means which detected the frame synchronization pattern;

signal selection means for selecting the baseband signal whose phase was rotated by the complex calculation means of one of the first to third pattern detection means identified by the identification means;

phase error identification means for identifying a phase error by comparing the phase of the baseband signal selected by the signal selection means and an absolute phase;

frequency error identification means for identifying a frequency error contained in the baseband signal in accordance with the phase error identified by the phase error identification means; and carrier recovery means for recovering a carrier to be used for removing the phase error and frequency error contained in the baseband signal, by controlling the waveform data making means of one of the first to third pattern detection means identified by the identification means in accordance with the phase error identified by the phase error identification means and the frequency error identified by the frequency error identification means.

After the frame synchronization is established, phase and frequency synchronization can be made for removing the phase and frequency errors contained in the baseband signal.

According to a second aspect of the present invention, there is provided a synchronization acquiring circuit for receiving a baseband signal transferred as an intermediate frequency signal obtained through frequency conversion of a received radio wave and for acquiring a radio frequency channel of BS digital broadcasting, wherein:

the baseband signal is received which contains a frequency error corresponding to a whole frequency range of the intermediate frequency signal, the baseband signal being used for acquiring the radio frequency channel, a frame synchronization pattern is detected through conversion into a digital signal and in correspondence with the frequency error, and a carrier synchronized with a frequency of the baseband signal is recovered in accordance with a range of the frequency error contained in the baseband signal from which the frame synchronization pattern was detected, to thereafter establish a frame synchronization.

According to the second aspect, the frame synchronization pattern can be detected from the digital signal converted in correspondence with the range of a frequency error contained in the baseband signal received for acquiring a radio frequency channel of BS digital broadcasting. It is therefore possible to quickly establish the frame synchronization and acquire an RF channel in a short time.

According to a third aspect of the present invention, there is provided a synchronization acquiring circuit for receiving a baseband signal transferred as an intermediate frequency signal obtained by down-converting a received radio wave and for acquiring a radio frequency channel, comprising:

signal conversion means for identifying a phase of a received baseband signal phase-modulated in a symbol unit and converting the baseband signal into a digital signal corresponding to the identified phase;

a plurality of pattern detection means disposed in parallel for detecting a predetermined frame synchronization pattern transferred by the baseband signal, in accordance with the digital signal generated through conversion by the signal conversion means, each of the plurality of pattern detection means being related to a frequency of the intermediate frequency signal in a different frequency range; and frequency control means for changing the frequency of the baseband signal by an off-set frequency corresponding to a frequency error contained in the baseband signal, when one of the plurality of pattern detection means detects the frame synchronization pattern, and for establishing a frame synchronization after the signal conversion means identifies the phase of the baseband signal.

More specifically, according to the third aspect, the synchronization acquiring circuit for receiving a baseband signal transferred as an intermediate frequency signal obtained by down-converting a received radio wave and for acquiring a radio frequency channel, comprises:

first pattern detection means for detecting a predetermined frame synchronization pattern transferred by the baseband signal, in accordance with the digital signal generated through conversion by the signal conversion means, if a center frequency of a range assigned to the radio frequency channel corresponds to a frequency of the intermediate frequency signal in a predetermined frequency range;

second pattern detection means for detecting the predetermined frame synchronization pattern transferred by the baseband signal, in accordance with the digital signal generated through conversion by the signal conversion means, if the center frequency of the range assigned to the radio frequency channel corresponds to the frequency of the intermediate frequency signal in a frequency range higher than the frequency range of the intermediate frequency signal from which the first pattern detection means can detect the frame synchronization pattern;

third pattern detection means for detecting the predetermined frame synchronization pattern transferred by the baseband signal, in accordance with the digital signal generated through conversion by the signal conversion means, if the center frequency of the range assigned to the radio frequency channel corresponds to the frequency of the intermediate frequency signal in a frequency range higher than the frequency range of the intermediate frequency signal from which the second pattern detection means can detect the frame synchronization pattern;

fourth pattern detection means for detecting the predetermined frame synchronization pattern transferred by the baseband signal, in accordance with the digital signal generated through conversion by the signal conversion means, if the center frequency of the range assigned to the radio frequency channel corresponds to the frequency of the intermediate frequency signal in a frequency range lower than the frequency range of the intermediate frequency signal from which the first pattern detection means can detect the frame synchronization pattern; fifth pattern detection means for detecting the predetermined frame synchronization pattern transferred by the baseband signal, in accordance with the digital signal generated through conversion by the signal conversion means, if the center frequency of the range assigned to the radio frequency channel corresponds to the frequency of the intermediate frequency signal in a frequency range lower than the frequency range of the intermediate frequency signal from which the first fourth detection means can detect the frame synchronization pattern; and frequency control means for transforming the frequency of the baseband signal by an off-set frequency corresponding to a frequency error contained in the baseband signal, when one of the first to fifth pattern detection means detects the frame synchronization pattern, for making the signal conversion means identify a phase of the baseband signal, and for making the first pattern detection means detect the frame synchronization pattern to thereafter establish a frame synchronization.

According to the third aspect, the first to fifth pattern detection means can detect the frame synchronization pattern in accordance with the digital signal generated through conversion by the signal conversion means, if the center frequency of the band assigned to the radio frequency channel corresponds to the frequency of the intermediate frequency signal in the predetermined frequency range.

As the frame synchronization pattern is detected, the frequency of the baseband signal is changed by using the off-set frequency corresponding to the frequency error contained in the baseband signal, and the first pattern detection means detects the frame synchronization pattern.

If the first pattern detection means is set so that it can detect the frame synchronization pattern from the baseband signal having a broader band than other pattern detection means, the broader frequency range can be scanned quickly and the stable frame synchronization can be established.

It is desired that:

the signal conversion means has:

eight de-mapping means each for specifying the phase of the baseband signal on a phase plane having a decision criterion border line whose phase is rotated by $\phi=45°\times n$ (where n is an integer of 0 to 7) and obtaining the converted digital signal, the decision criterion border line being used for specifying a value of the converted digital signal corresponding to the specified phase of the baseband signal;

the first pattern detection means has:

eight sequence decision means each for deciding whether each digital signal sequence generated through conversion by each of the eight de-mapping means contains the predetermined frame synchronization pattern; and means for notifying the frequency control means of that the frame synchronization pattern was detected, if at least one of the eight sequence decision means decides that the frame synchronization pattern is contained;

the second and fourth pattern detection means have each:

eight first rotation sequence decision means for deciding whether the predetermined frame synchronization pattern is contained, by using three of eight digital sequences generated trough conversion by the eight de-mapping means; and the third and fifth pattern detection means have each:

eight second rotation sequence decision means for deciding whether the predetermined frame synchronization pattern is contained, by using four of eight digital sequences generated through conversion by the eight de-mapping means.

It is desired that:

first and second rotation sequence decision means each have:

delay means for delaying each bit of the digital signal sequence; and means for deciding whether the predetermined frame synchronization pattern is contained, by deriving the digital signal sequence from the delay means in a manner that the phase of the decision criterion border line rotates in the same direction as a signal reception time lapses.

The second to fifth pattern detection means can detect a frame synchronization pattern transferred by the baseband signal corresponding to each of different frequency ranges.

More specifically:

the first rotation sequence decision means of the second pattern detection means and the first rotation sequence decision means of the fourth pattern detection means derive the digital signal sequence from the delay means in a manner that the phase of the decision criterion border lines rotate in opposite directions as a signal reception time lapses; and the second rotation sequence decision means of the third pattern detection means and the second rotation sequence decision means of the fifth pattern detection means derive the digital signal sequence from the delay means in a manner that the phase of the decision criterion border lines rotate in opposite directions as a signal reception time lapses.

It is desired that the frequency control means comprises:

waveform data making means for creating waveform data to be used for rotating a phase of the baseband signal;

complex calculation means for rotating the phase of the baseband signal by executing a complex number calculation between the waveform data created by the waveform making means and the received baseband signal;

phase error identification means for identifying a phase error by comparing the phase of the baseband signal rotated by the complex calculation means and an absolute phase;

frequency error identification means for identifying a frequency error contained in the baseband signal in accordance with the phase error identified by the phase error identification means; and carrier recovery means for recovering a carrier to be used for removing the phase error and frequency error contained in the baseband signal, by controlling the waveform data making means in accordance with the phase error identified by the phase error identification means and the frequency error identified by the frequency error identification means.

According to a fourth aspect of the invention, there is provided a synchronization acquiring method of receiving a baseband signal transferred as an intermediate frequency signal obtained by down-converting a received radio wave and for acquiring a radio frequency channel, comprising:

a first pattern detection step of receiving the baseband signal transferred by the intermediate frequency signal in a predetermined frequency range and detecting a predetermined frame synchronization pattern;

a second pattern detection step of receiving, at the same time as the first pattern detection step, the baseband signal transferred by the intermediate frequency signal in a frequency range higher than the frequency range of the intermediate frequency signal transferring the baseband signal from which the first pattern detection step can detect the frame synchronization pattern, and detecting the predetermined frame synchronization pattern;

a third detection step of receiving, at the same time as the first and second pattern detection steps, the baseband signal transferred by the intermediate frequency signal in a frequency range lower than the frequency range of the intermediate frequency signal transferring the baseband signal from which the first pattern detection step can detect the frame synchronization pattern, and detecting the predetermined frame synchronization pattern; and a carrier recovery step of establishing a frame synchronization and recovering a carrier to be used for removing a frequency error of the baseband signal when one of the first to third pattern detection steps detects the frame synchronization pattern.

BRIEF DESCRIPTION OF THE DRAWINGS

FIG. 2 is a schematic diagram illustrating mapping of each modulation method on the transmission side.

EMBODIMENTS OF THE INVENTION

First Embodiment

A synchronization acquiring circuit according to the first embodiment of the invention will be described in detail with reference to the accompanying drawings.

In this synchronization acquiring circuit, an outdoor unit (ODU) or the like down-converts a received radio wave to obtain a broadcasting satellite-intermediate frequency (BS-IF) signal which is quasi-synchronization detected by a quadrature detector to obtain a baseband signal. The baseband signal is quantized for establishing a synchronization.

A baseband signal input to the synchronization acquiring circuit is repetitively transmitted one frame after another after being subjected to a plurality of modulation methods time divisionally used and having different C/N (carrier-to-noise) values required, such as 8PSK (phase shift keying) modulation, QPSK (quadrature PSK) modulation and BPSK (binary PSK) modulation. Such a transmission method is called a hierarchical transmission method.

Figure 1:
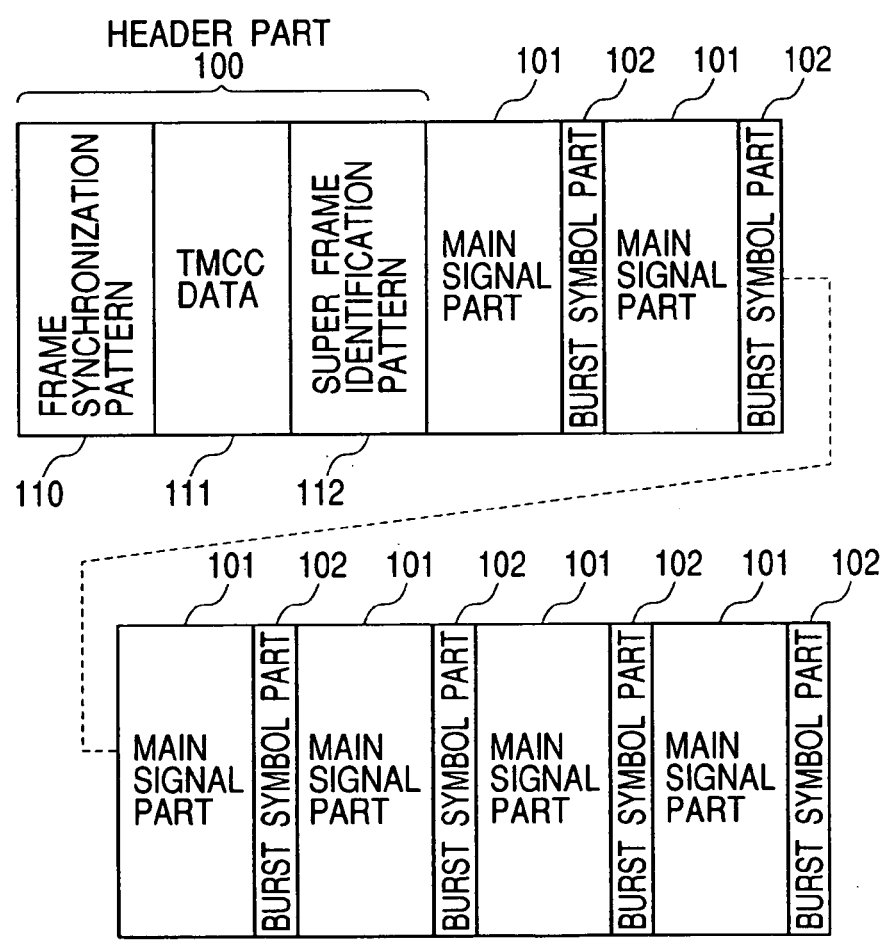
FIG. 1 is a diagram showing an example of a frame structure used by a hierarchical transmission method.

FIG. 1 is a diagram showing the frame structure used by the hierarchical transmission method.

As shown in FIG. 1, one frame is constituted of 39,936 symbols including a header part 100 of 192 symbols and a plurality of pairs of a main signal part 101 of 203 symbols and a burst symbol part 102 of 4 symbols.

The header part 100 includes a frame synchronization pattern 110 which is transmitted by BPSK modulation, transmission and multiplexing configuration control (TMCC) data 111 and a super frame identification pattern 112.

The frame synchronization pattern 110 is used for transmitting a bit stream for establishing a frame synchronization by using predetermined 20 bits among 32 bits. The bit stream $(S_{19}S_{18}S_{17} \ldots S_1S_0)$ in the order of transmission for establishing a frame synchronization is (11101100110100101000).

The TMCC data 111 is transmission multiplex and configuration control data representative of the multiplexing configuration of the time division and multiplexing modulation.

Eight frames constitute one super frame. The super frame identification pattern 112 is a pattern for identifying the position of each frame in the super frame.

The main signal part 101 is transmitted by a TC8PSK (Trellis-coded 8PSK) or QPSK modulation method. The burst symbol part 102 is transmitted by BPSK, is a pseudo noise (PN) signal reset at each frame, and is energy-spread.

On the transmission side, the following mapping is performed for each modulation method.

FIG. 2(a) shows the layout of signal points when 8PSK is used as the modulation method.

With the 8PSK modulation method, digital signals of 3 bits (abc: a, b, c=0 or 1) are assigned eight different phases shown in FIG. 2(a) and transmitted.

Namely, the 8PSK modulation method uses eight combinations of bits constituting one symbol, including (000), (001), (010), (011), (100), (101), (110) and (111). These digital signals each constituted of three bits are converted into the signal positions "0" to "7" on the I-Q (in-phase-quadrature) vector plane on the transmission side as shown in FIG. 2(a). This conversion is called 8PSK mapping.

In FIG. 2(a), as one example, the bit train (000) is converted into a signal point position "0", the bit train (001) is converted into a signal point position "1", the bit train (101) is converted into a signal point position "2", the bit train (100) is converted into a signal point position "3", the bit train (110) is converted into a signal point position "4", the bit train (111) is converted into a signal point position "5", the bit train (011) is converted into a signal point position "6", and the bit train (010) is converted into a signal point position "7".

FIG. 2(b) shows the layout of signal points when QPSK is used as the modulation method.

With the QPSK modulation method, digital signals of 2 bits (de: d, e=0 or 1) are assigned four different phases shown in FIG. 2(b) and transmitted.

Namely, the QPSK modulation method uses four combinations of bits constituting one symbol, including (00), (01), (10) and (11). In FIG. 2(b), as one example, the bit train (00) is converted into the signal point position "1", the bit train (10) is converted into the signal point position "3", the bit train (11) is converted into the signal point position "5", and the bit train (01) is converted into the signal point position "7". This conversion is called QPSK mapping.

In FIG. 2(b), the relation between the signal point position and its number is set to the relation same as the relation between the signal point position and its number of 8PSK shown in FIG. 2(a).

Similarly. FIG. 2(c) is a diagram showing the layout of signal points when BPSK is used as the modulation method. With the BPSK modulation method, a digital signal of one bit (f:f=0 or 1) is assigned two different phases and transmitted.

Figure 3:
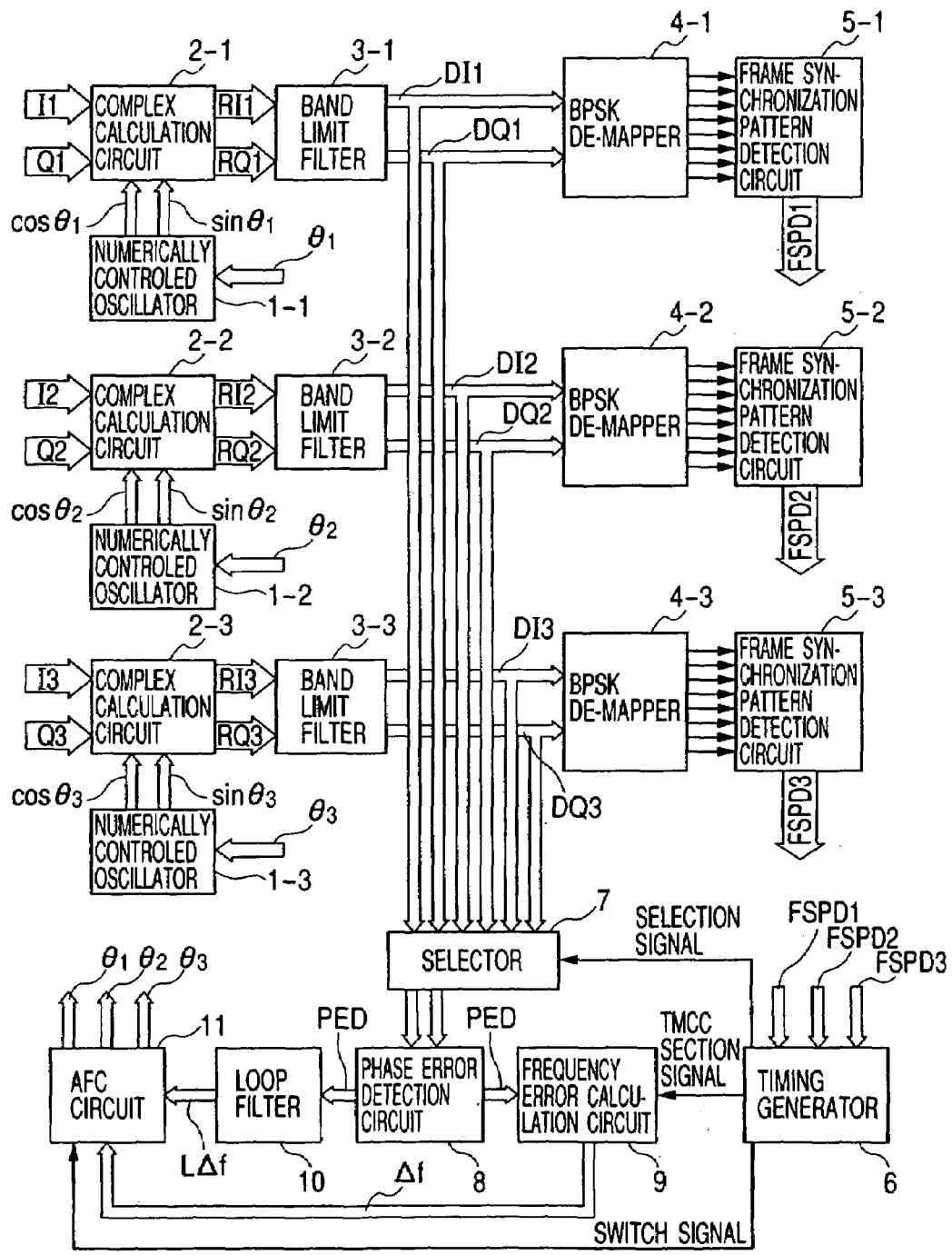
FIG. 3 is a diagram showing the structure of a synchronization acquiring circuit according to a first embodiment of the invention.

In FIG. 2(c), as one example, the bit "0" is converted into the signal point position "0" and the bit "1" is converted into the signal point position FIG. 3 shows the synchronization acquiring circuit for establishing a synchronization by receiving a carrier with which the digital signal is transmitted by the above-described hierarchical transmission method.

As shown in FIG. 3, the synchronization acquiring circuit has numerically controlled oscillators 1-1 to 1-3, complex calculation circuits 2-1 to 2-3, band limit filters 3-1 to 3-3, binary phase shift keying (BPSK) demappers 4-1 to 4-3, frame synchronization pattern detection circuits 5-1 to 5-3, a timing generator 6, a selector 7, a phase error detection circuit 8, a frequency error calculation circuit 9, a loop filter 10, and an automatic frequency control (AFC) circuit 11.

The numerically controlled oscillators 1-1 to 1-3 generate sine wave data $\sin \theta_1$ to $\sin \theta_3$ and cosine wave data $\cos \theta_1$ to $\cos \theta_3$, respectively. The numerically controlled oscillators 1-1 to 1-3 generate digital signals representative of the amplitudes of the sine wave data or cosine wave data corresponding to the phase signals $\theta_1$ to $\theta_3$ received from the AFC circuit 11, and send them to the complex calculation circuits 2-1 to 2-3.

The complex calculation circuits 2-1 to 2-3 are each made of an inverter, a multiplier and the like, and perform calculations for removing the phase error and frequency error of the quantized baseband signal.

More specifically, each of the complex calculation circuits 2-1 to 2-3 receives the in-phase component I and quadrature component Q of the baseband signal containing the phase error and frequency error. The complex calculation circuits 2-1 to 2-3 also receive the sine wave data $\sin \theta_1$ to $\sin \theta_3$ and cosine wave data $\cos \theta_1$ to $\cos \theta_3$ from the numerically controlled oscillators 1-1 to 1-3. The complex calculation circuits 2-1 to 2-3 perform an inversion process and the like for the received sine wave data $\sin \theta_1$ to $\sin \theta_3$ and cosine wave data $\cos \theta_1$ to $\cos \theta_3$, and multiply them with the in-phase component I and quadrature component Q of the baseband signal to thereby generate I (in-phase) signals RI1 to RI3 and Q (quadrature) signals RQ1 to RQ3.

The complex calculation circuits 2-1 to 2-3 send the generated I signals RI1 to RI3 and Q signals RQ1 to RQ3 to the band limit filters 3-1 to 3-3.

The band limit filters 3-1 to 3-3 are each made of a digital roll-off filter or the like having the raised cosine characteristics, and limit the pass bands of the I signals RI1 to RI3 and Q signals RQ1 to RQ3 received from the complex calculation circuits 2-1 to 2-3 to thereby generate data waveforms having no inter-code interference. The band limit filters 3-1 to 3-3 send the band-limited I signals DI1 to DI3 and Q signals DQ1 to DQ3 to the BPSK demappers 4-1 to 4-3.

The band limit filters 3-1 to 3-3 also send the band-limited I signals DI1 to DI3 and Q signals DQ1 to DQ3 to the selector 7.

The BPSK demappers 4-1 to 4-3 recover the digital signals from the signal point positions of the baseband signal in the manner opposite to the BPSK mapping on the transmission side, in order to detect the frame synchronization pattern 110 of 20 symbols transmitted through BPSK modulation.

Figure 4:
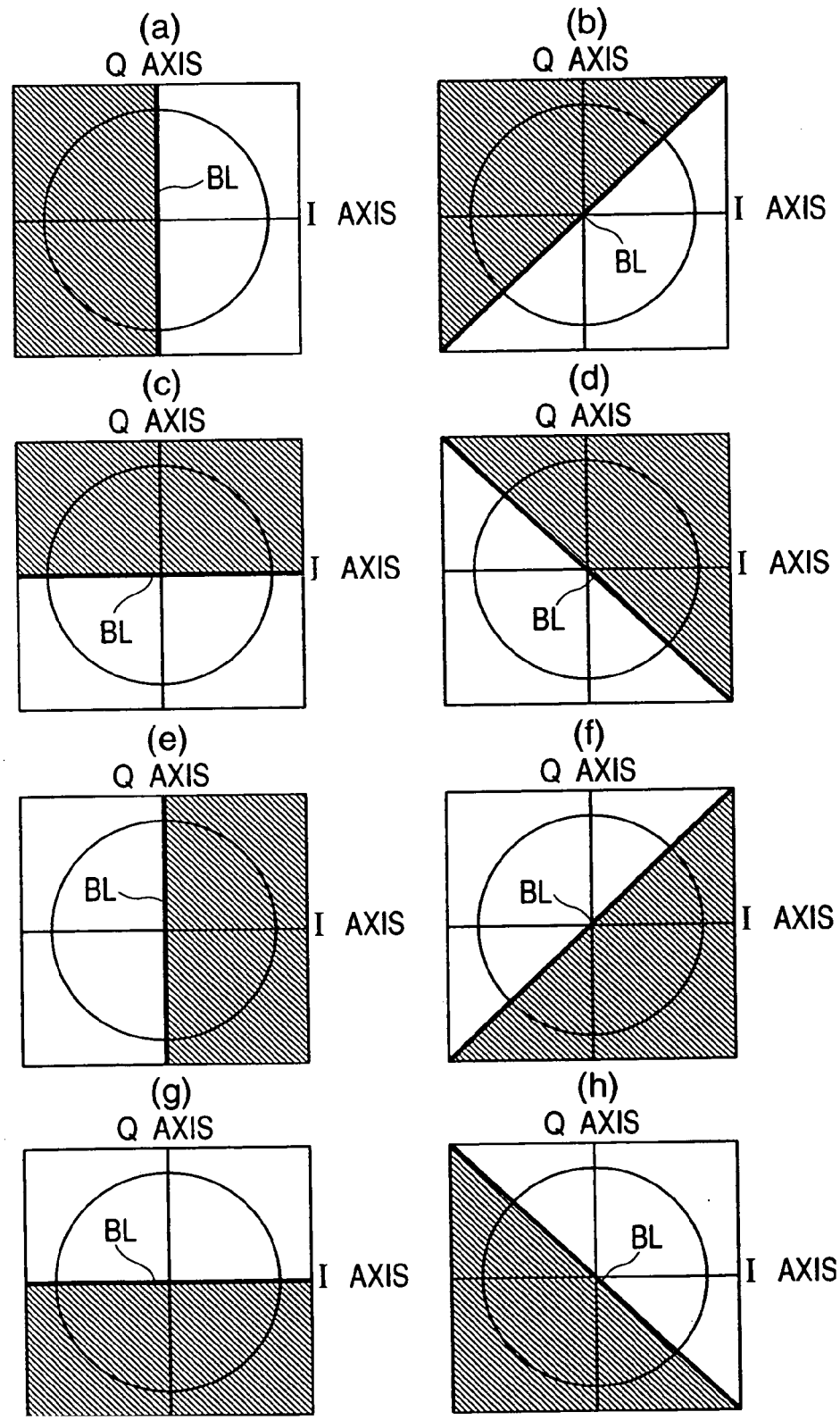
FIG. 4 is a diagram showing an I-Q vector plane used when BPSK demappers recover a digital signal.

More specifically, upon reception of the I signals DI1 to DI3 and Q signals DQ1 to DQ3 from the band limit filters, the BPSK demappers 4-1 to 4-3 obtain received signal points on the I-Q vector plane on the reception side such as shown in FIGS. 4(*a*) to 4(*h*). The BPSK demappers 4-1 to 4-3 convert the baseband signal into the digital signals (0 or 1) corresponding to the received signal point positions on the I-Q vector plane.

Figure 5:
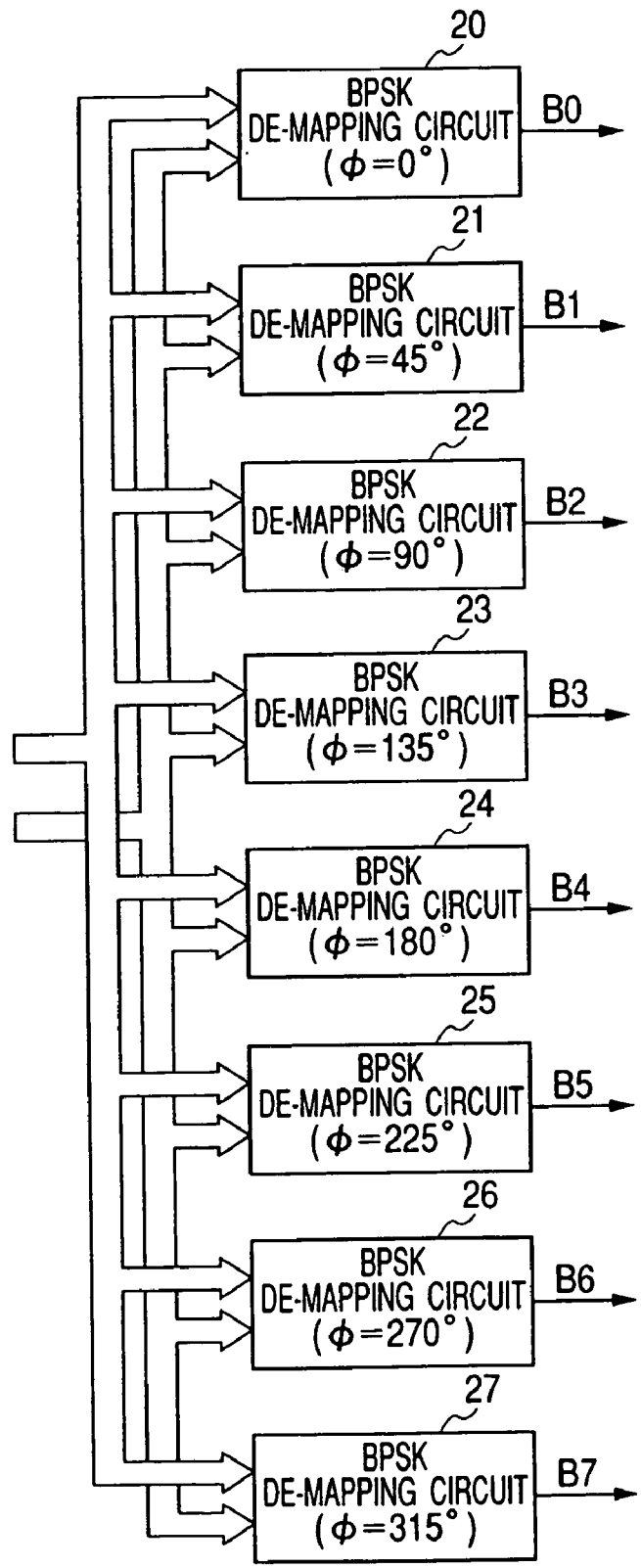
FIG. 5 is a diagram showing the structure of BPSK demappers.

As shown in FIG. 5, each of the BPSK demappers 4-1 to 4-3 has eight BPSK de-mapping circuits 20 to 27.

Each of the BPSK de-mapping circuits 20 to 27 is made of a read only memory (ROM) and the like, and converts the received signal point into a digital signal by using one of eight I-Q vector planes having different phases of BPSK decision criterion border lines BL shown in FIGS. 4(*a*) to 4(*h*).

More specifically, each of the BPSK de-mapping circuits 20 to 27 specifies a received signal point and converts it into a digital signal, by using the I-Q vector plane whose BPSK decision criterion border line BL is rotated by an angle corresponding to $\phi=45°\times n$ (n is an integer from 0 to 7) from the I-Q vector plane on the transmission side.

It is assumed in the following that the BPSK de-mapping circuit 20 first converts a signal point into a digital signal by using the I-Q vector plane shown in FIG. 4(*a*), and sequentially thereafter the BPSK de-mapping circuits 21 to 27 convert a signal point into a digital signal by using the I-Q vector planes shown in FIGS. 4(*b*) to 4(*h*).

The BPSK de-mapping circuits 20 to 27 send bit streams B0 to B7 of the recovered digital signals to the frame synchronization pattern detection circuits 5-1 to 5-3.

The frame synchronization pattern detection circuits 5-1 to 5-3 shown in FIG. 3 detect frame synchronization patterns from the digital signals recovered by the BPSK demappers 4-1 to 4-3. The frame synchronization pattern detection circuits 5-1 to 5-3 correspond to three different frequency ranges representative of frequency errors of the baseband signal. The frame synchronization pattern detection circuits 5-1 to 5-3 receive the bit streams B0 to B7 from the BPSK demappers 4-1 to 4-3 and detect a frame synchronization pattern 110.

Specifically, for example, the frame synchronization pattern detection circuit 5-1 corresponds to a frequency range of ±700 kHz of the frequency error of +1.3 MHz, the frame synchronization pattern detection circuit 5-2 corresponds to a frequency range of ±700 kHz of the frequency error of 0 Hz of the frequency error, and the frame synchronization pattern detection circuit 5-3 corresponds to a frequency range of ±700 kHz of the frequency error of −1.3 MHz of the frequency error.

Figure 6:
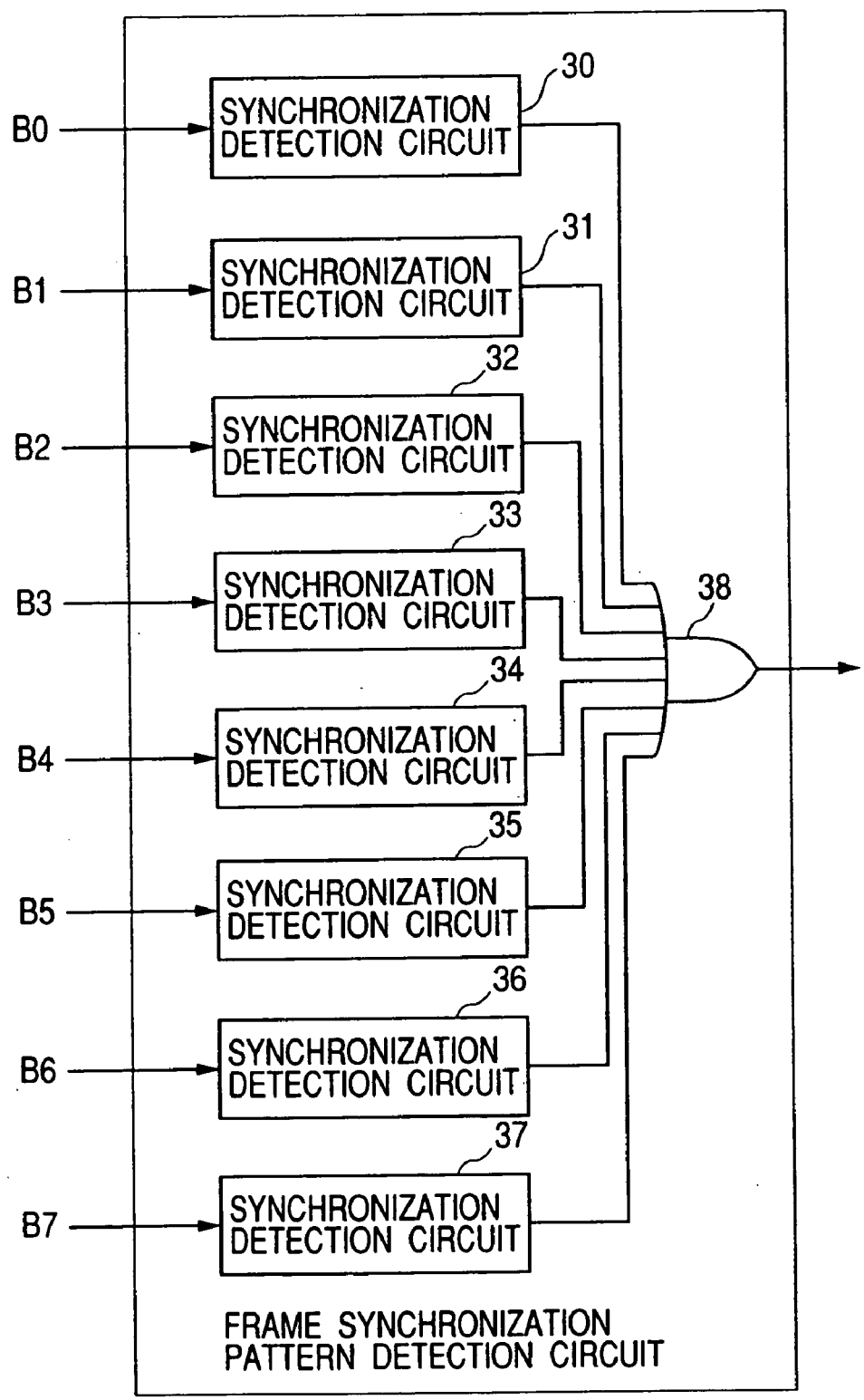
FIG. 6 is a diagram showing the structure of a frame synchronization pattern detection circuit.

Each of the frame synchronization pattern detection circuits 5-1 to 5-3 has eight synchronization detection circuits 30 to 37 and an OR gate 38 shown in FIG. 6.

Figure 7:
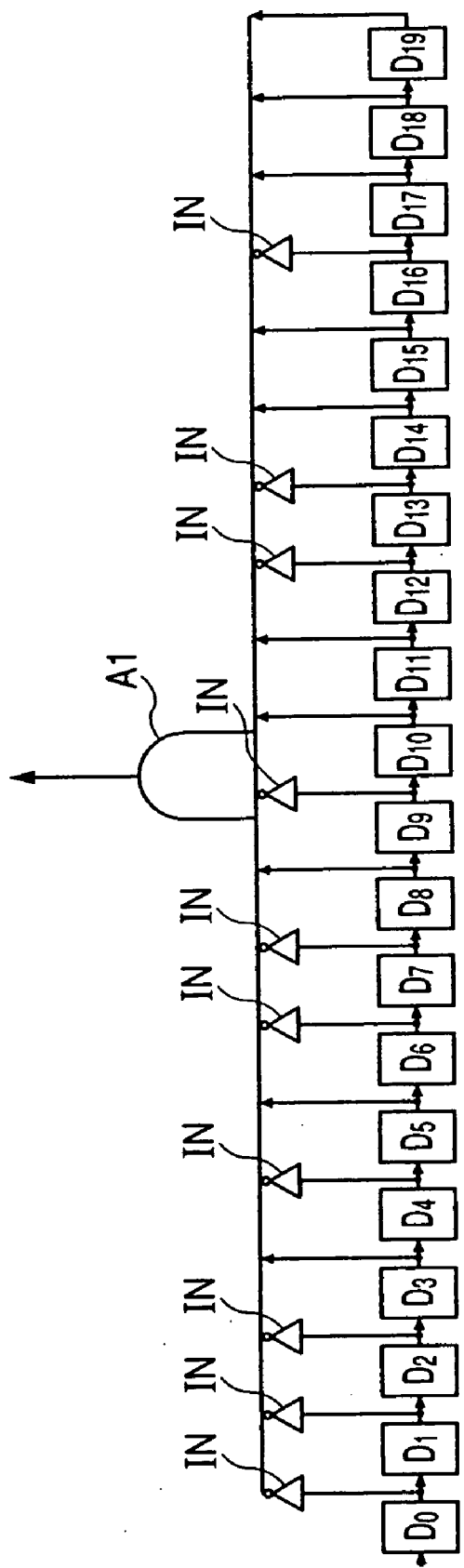
FIG. 7 is a diagram showing the structure of a synchronization detector.

The synchronization detection circuits 30 to 37 all have the same structure having twenty shift registers (delay latches $D_0$ to $D_{19}$), inverters IN for the logical inversion of predetermined bits, and an AND gate A1, as shown in FIG. 7.

The AND gate A1 outputs a high level voltage when the state $(D_{19}D_{18}D_{17} \ldots D_1D_0)$ of the delay latches $D_0$ to $D_{19}$ takes (11101100110100101000). This corresponds to the bit stream of the frame synchronization pattern 110. When the output of the AND gate A1 take a high potential, it means that one of the synchronization decision circuits 30 to 37 detected the frame synchronization pattern.

When one of the synchronization detection circuits 30 to 37 detects the frame synchronization pattern 110, the OR gate 38 notifies this detection to the timing generator 6.

The timing generator 6 shown in FIG. 3 establishes a frame synchronization when it is notified from the frame synchronization pattern detection circuits 5-1 to 5-3 that the frame synchronization pattern 110 was detected.

In this case, the timing generator 6 decides which one of the frame synchronization pattern detection circuits 5-1 to 5-3 detected the frame synchronization pattern 110, and sends a selection signal corresponding to the decided one of the frame synchronization pattern detection circuits 5-1 to 5-3, to the selector 7.

Namely, when the timing generator 6 decides that the frame synchronization pattern detection circuit 5-1 detected the frame synchronization pattern 110, it sends the selector 7 a selection signal to select the I signal DI1 and Q signal DQ1 output from the band limit filter 3-1. When the timing generator 6 decides that the frame synchronization pattern detection circuit 5-2 detected the frame synchronization pattern 110, it sends the selector 7 a selection signal to select the I signal DI2 and Q signal DQ2 output from the band limit filter 3-2. When the timing generator 6 decides that the frame synchronization pattern detection circuit 5-3 detected the frame synchronization pattern 110, it sends the selector 7 a selection signal to select the I signal DI3 and Q signal DQ3 output from the band limit filter 3-2.

After the timing generator 6 establishes the frame synchronization, it derives the TMCC data 111 to identify the frame multiplex configuration, and sends a TMCC section signal to the frequency error calculation circuit 9 to specify the TMCC section.

The timing generator 6 also sends a switch signal to the AFC circuit 11 which makes one of the numerically controlled oscillators 1-1 to 1-3 recover a carrier for acquiring the RF channel under the control of the phase signals $\theta_1$ to $\theta_3$.

In response to the selection signal from the timing generator 6, the selector 7 made of a multiplexer and the like selects a pair of the I signals DI1 to DI3 and Q signals DQ1 to DQ3 output from one of the band limit filters 3-1 to 3-3. The selector 7 inputs the selected I signal DI and W signal DQ to the phase error detection circuit 8.

In accordance with the I signal DI and W signal DQ received from the selector 7, the phase error detection circuit 8 specifies the signal point position on the I-Q vector plane to obtain a phase error (received signal phase rotation angle) between the phase of the signal point position and the absolute phase.

The phase error detection circuit 8 generates a phase error signal PED corresponding to the obtained phase error, and sends it to the frequency error calculation circuit 9 and loop filter 10.

The frequency error calculation circuit 9 specifies the TMCC section from the TMCC section signal received from the timing generator 6, and calculates a difference (error frequency) Δf between a desired frequency and the frequency of the recovered carrier, in accordance with the phase error in the TMCC section represented by the phase error signal PED received from the phase error detection circuit 8.

The frequency error calculation circuit 9 notifies the calculated error frequency Δf to the AFC circuit 11.

The loop filter is a low pass filter for smoothing the phase error signal PED received from the phase error detection circuit 8, and supplies the smoothed phase error signal PED to the AFC circuit 11 as a phase adjustment signal LΔf.

The AFC circuit 11 generates phase signals $\theta_1$ to $\theta_3$ corresponding to the error frequency Δf supplied from the frequency error calculation circuit 9 and the phase adjustment signal LΔf supplied from the loop filter 10.

The AFC circuit 11 supplies the generated phase signals $\theta_1$ to $\theta_3$ to the numerically controlled oscillators 1-1 to 1-3 to make them generate the sine wave data $\sin\theta_1$ to $\sin\theta_3$ and cosine wave data $\cos\theta_1$ to $\cos\theta_3$.

If the baseband signal received at the complex calculation circuit 2-1 contains a frequency error of +1.3 MHz, the AFC circuit 11 performs a complex number calculation of the phase signal $\theta_1$ to set it to such a value that the phase of the signal point assigned a predetermined signal (0 or 1) on the transmission side will not rotate.

If the baseband signal received at the complex calculation circuit 2-2 does not contain a frequency error (a frequency error of 0 MHz), the AFC circuit 11 performs a complex number calculation of the phase signal $\theta_2$ to set it to such a value that the phase of the signal point assigned a predetermined signal (0 or 1) on the transmission side will not rotate.

If the baseband signal received at the complex calculation circuit 2-3 contains a frequency error of −1.3 MHz, the AFC circuit 11 performs a complex number calculation of the phase signal $\theta_3$ to set it to such a value that the phase of the signal point assigned a predetermined signal (0 or 1) on the transmission side will not rotate.

The operation of the synchronization acquiring circuit according to the first embodiment of the invention will be described.

This synchronization acquiring circuit can acquire an RF channel of BS digital broadcasting in a short time, because it has a plurality of reception series for detecting a frame synchronization pattern, the reception series corresponding in number to a plurality of frequency ranges each being representative of a different frequency error contained in the baseband signal.

In the synchronization acquiring circuit of the first embodiment of the invention, the numerically controlled oscillators 1-1 to 1-3, complex calculation circuits 2-1 to 2-3, band limit filters 3-1 to 3-3, selector 7, phase error detection circuit 8, frequency error calculation circuit 9, loop filter 10 and AFC circuit 11 constitute a carrier reproduction loop which removes the frequency error of the carrier contained in the in-phase component I and quadrature component Q of the baseband signal input to the complex calculation circuits 2-1 to 2-3.

More specifically, first the complex calculation circuits 2-1 to 2-3 receive the in-phase component I and quadrature component Q of the baseband signal which are obtained by detecting the BS-IF signal of the received radio wave down-converted by an ODU (not shown), by using a local oscillation signal generated by a local oscillator and having a frequency fixed to the center frequency of a frequency band assigned to an RF channel of BS digital broadcasting.

The frequency error generated when ODU down-converts the received radio wave appears in the BS-IF signal which is an intermediate signal and also in the baseband signal.

By using the sine wave data $\sin\theta_1$ to $\sin\theta_3$ and cosine wave data $\cos\theta_1$ to $\cos\theta_3$ received from the numerically controlled oscillators 1-1 to 1-3, the complex calculation circuits 2-1 to 2-3 perform calculations of the formulas 2 to rotate the phase of the baseband signal:

$$RIk = I \times \cos\theta_k - Q \times \sin\theta_k$$

$$RQk = I \times \sin\theta_k + Q \times \cos\theta_k \qquad \text{(Formulas 2)}$$

where k is an integer of 0 to 3.

If the baseband signal received at the complex calculation circuit 2-1 contains a frequency error of +1.3 MHz, the AFC circuit 11 performs a complex number calculation of the phase signal $\theta_1$ to set it to such a value that the phase of the signal point assigned a predetermined signal (0 or 1) on the transmission side will not rotate.

If the baseband signal received at the complex calculation circuit 2-2 does not contain a frequency error (a frequency error of 0 MHz), the AFC circuit 11 performs a complex number calculation of the phase signal $\theta_2$ to set it to such a value that the phase of the signal point assigned a predetermined signal (0 or 1) on the transmission side will not rotate.

If the baseband signal received at the complex calculation circuit 2-3 contains a frequency error of −1.3 MHz, the AFC circuit 11 performs a complex number calculation of the phase signal $\theta_3$ to set it to such a value that the phase of the signal point assigned a predetermined signal (0 or 1) on the transmission side will not rotate on the reception side.

Namely, the AFC circuit 11 sets the phase signal $\theta_1$ to such a value that the frame synchronization pattern 110 can be detected by receiving the baseband signal which is contained in the intermediate frequency signal (BS-IF signal) in a predetermined frequency range higher than the oscillation frequency of a local oscillation signal generated by a local oscillator (not shown) and used for quasi-synchronization detection.

The AFC circuit 11 sets the phase signal $\theta_2$ to such a value that the frame synchronization pattern 110 can be detected by receiving the baseband signal which is contained in the intermediate frequency signal (BS-IF signal) in a predetermined frequency range including the same frequency as the oscillation frequency of a local oscillator (not shown).

The AFC circuit 11 sets the phase signall $\theta_3$ to such a value that the frame synchronization pattern 110 can be detected by receiving the baseband signal which is contained in the intermediate frequency signal (BS-IF signal) in a predetermined frequency range lower than the oscillation frequency of a local oscillator (not shown).

Upon reception of the phase signals $\theta_1$ to $\theta_3$ from the AFC circuit 11, the numerically controlled oscillators 1-1 to 1-3 generate the sine wave data $\sin\theta_1$ to $\sin\theta_3$ and cosine wave data $\cos\theta_1$ to $\cos\theta_3$ and supply them to the complex calculation circuits 2-1 to 2-3.

The complex calculation circuits 2-1 to 2-3 input the obtained I signals RI1 to RI3 and Q signals RQ1 to RQ3 to the band limit filters 3-1 to 3-3 to limit the bands thereof and obtain the I signals DI1 to DI3 and Q signals DQ1 to DQ3.

In this manner, the complex calculation circuits 2-1 to 2-3 can change the frequency of the baseband signal so that the frame synchronization pattern 110 can be detected in the range of ±2 MHz of the frequency error contained in the baseband signal. Therefore, if the frequency error generated when ODU down-converts is in the range of ±2 MHz, it is possible to detect the frame synchronization pattern and acquire the RF channel.

The I signals DI1 to DI3 and Q signals DQ1 to Dq3 output from the band limit filters 3-1 to 3-3 are input to the BPSK demappers 4-1 to 4-3 and to the selector 7.

The selector 7 selects a pair of the I signals DI1 to DI3 and Q signals DQ1 to DQ3 output from one of the band limit filters 3-1 to 3-3, and sends the pair to the phase error detection circuit 8.

Whether the selector 7 selects which pair of the I signals DI1 to DI3 and Q signals DQ1 to DQ3 is determined by the selection signal supplied from the timing generator 6.

The operations up to outputting the selection signal from the timing generator 6 will be described.

When the I signals DI1 to DI3 and Q signals DQ1 to DQ3 output from the band limit filters 3-1 to 3-3 are input to the BPSK demappers 4-1 to 4-3, the BPSK de-mapping circuits 20 to 27 recover the digital signals.

In this case, in order to convert the received signal point into the digital signal, each of the BPSK de-mapping circuits 20 to 27 specifies the received signal point on the I-Q vector plane having the BPSK decision criterion border line BL whose phase is rotated so as to match the I-Q vector plane rotated by $\phi=45°\times n$ (n is an integer of 0 to 7).

The reason why the signal point is converted into the digital signal by using the eight I-Q vector planes having the BPSK decision criterion border lines BL whose phases are rotated, is as follows.

Namely, in the hierarchical transmission method of repetitively transmitting each frame by using a plurality of time division modulation methods, the TMCC data 111 representative of the transmission multiplexing configuration identification data indicating the multiplexing configuration of modulation methods, is derived at the timing generated by the frame synchronization pulse after the frame synchronization is established. By identifying the multiplexing configuration of the modulation method indicated by the TMCC data 111, the processes for each modulation method can be executed.

Since the 8PSK demodulation is also performed until the frame synchronization is established, the phase of the baseband signal may rotate by $\phi=45°\times n$ (n is an integer of 0 to 7) until the frame synchronization is demodulated, depending upon the phase of the carrier recovered by the numerically controlled oscillators 1-1 to 1-3 and AFC circuit 11.

For example, it is assumed that the bit "0" is assigned to the signal point position "0" shown in FIG. 2(c) and the bit "1" is assigned to the signal point position "4".

In this case, the signal points for the bits "0" and "1" specified by the I signals DI1 to DI3 and Q signals DQ1 to DQ3 received at the BPSK demappers 4-1 to 4-3 from the band limit filters 3-1 to 3-3, may appear at the signal point positions "0" and "4" at $\phi=0°$ shown in FIG. 2(c) which is same as those of the transmission side.

However, depending upon the phase of the carrier recovered by the numerically controlled oscillators 1-1 to 1-3 and AFC circuit 11, the signal points for the bits "0" and "1" may appear at the signal point positions "1" and "5" at the phase rotation of $\phi=45°$ shown in FIG. 2(a).

Alternatively, they may appear at the signal point positions "2" and "6" at the phase rotation of $\phi=90$, or may appear at the signal point positions "0" and "4" at the phase rotation of $\phi=135°$.

Since the phase may rotate by $\phi=45°\times n$ (n is an integer of 0 to 7) until the frame synchronization pattern 110 is demodulated, it is necessary to reliably detect the frame synchronization pattern 110 even if it is demodulated at each of eight phases.

From this reason, each of the BPSK demappers 4-1 to 4-3 has eight BPSG de-mapping circuit 20 to 27 and converts the signal point into a digital signal by using one of the eight I-Q vector planes having the BPSK decision criterion border lines BL whose phases are rotated.

The bit streams (B0 to B7) of the digital signal recovered by the BPSK demappers 4-1 to 4-3 are sent to the frame synchronization pattern detection circuits 5-1 to 5-3.

When the timing generator 6 is notified from one of the frame synchronization pattern detection circuits 5-1 to 5-3 that the frame synchronization pattern 110 was detected, it decides which one of the frame synchronization pattern detection circuits 5-1 to 5-3 detected the frame synchronization pattern 110, and sends the select signal corresponding to the decision result.

Namely, if the timing generator 6 decides that the frame synchronization pattern detection circuit 5-1 detected the frame synchronization pattern 110, it sends the selection signal to the selector 7 to select the I signal DI1 and Q signal DQ1 output from the band limit filter 3-1. If the timing generator 6 decides that the frame synchronization pattern detection circuit 5-2 detected the frame synchronization pattern 110, it sends the selection signal to the selector 7 to select the I signal DI2 and Q signal DQ2 output from the band limit filter 3-2. If the timing generator 6 decides that the frame synchronization pattern detection circuit 5-3 detected the frame synchronization pattern 110, it sends the selection signal to the selector 7 to select the I signal DI3 and Q signal DQ3 output from the band limit filter 3-3.

In this manner, the timing generator 6 can send the selection signal for making the selector 7 decide which pair of the I signals DI1 to DI3 and Q signals DQ1 to DQ3 is selected.

At the same time, the timing generator 6 establishes a frame synchronization at the timing when the timing generator receives a notice that the frame synchronization pattern 110 was detected, from one of the frame synchronization pattern detection circuits 5-1 to 5-3. Then, the timing generator 6 generates a TMCC section signal for specifying the TMCC section and sends it to the frequency error calculation circuit 9.

At the same time, the timing generator 6 sends a switch signal to the AFC circuit 11 to make it recover the carrier for acquiring an RF channel. The switch signal corresponds to the decision result of which one of the frame synchronization pattern detection circuits 5-1 to 5-3 detected the frame synchronization pattern 110.

Namely, if the timing generator 6 decides that the frame synchronization pattern detection circuit 5-1 detected the frame synchronization pattern 110, it sends the switch signal to the AFC circuit 11, the switch signal instructing the AFC circuit 11 to control the numerically controlled oscillator 1-1 by the phase signal $\theta_1$ and recover the carrier. If the timing generator 6 decides that the frame synchronization pattern detection circuit 5-2 detected the frame synchronization pattern 110, it sends the switch signal to the AFC circuit 11, the switch signal instructing the AFC circuit 11 to control the numerically controlled oscillator 1-2 by the phase signal $\theta_2$ and recover the carrier. If the timing generator 6 decides that the frame synchronization pattern detection circuit 5-3 detected the frame synchronization pattern 110, it sends the switch signal to the AFC circuit 11, the switch signal instructing the AFC circuit 11 to control the numerically controlled oscillator 1-3 by the phase signal $\theta_3$ and recover the carrier.

The I signal DI and Q signal DQ selected by the selector 7 are sent to the phase error detection circuit 8.

In accordance with the I signal DI and Q signal DQ received from the selector 7, the phase error detection circuit 8 specifies the signal point position on the I-Q vector plane, and calculates the phase error (reception point phase rotation angle) between the phase of the signal point position and the absolute phase.

The phase error detection circuit 8 sends a phase error signal PED corresponding to the calculated phase error to the frequency error calculation circuit 9 and loop filter 10.

The frequency error calculation circuit 9 specifies the TMCC section from the TMCC section signal received from the timing generator 6, and calculates a difference (error frequency) $\Delta f$ between the desired frequency and the frequency of the recovered carrier from the phase error in the TMCC section indicated by the phase error signal PED received from the phase error detection circuit 8.

The frequency error calculation circuit 9 notifies the calculated error frequency $\Delta f$ to the AFC circuit 11.

The loop filter 10 smoothes the phase error signal PED received from the phase error detection circuit 8 to obtain a phase adjustment signal L$\Delta f$ which is sent to the AFC circuit 11.

The AFC circuit 11 adjusts one of the phase signals $\theta_1$ to $\theta_3$ corresponding to the switch signal received from the timing generator 6, in accordance with the error frequency $\Delta F$ notified from the frequency error calculation circuit 9 and the phase adjustment signal L$\Delta f$ received from the loop filter 10, and supplies the adjusted phase signal to a corresponding one of the numerically controlled oscillators 1-1 to 1-3.

In this manner, the sine wave data sin $\theta_1$ to sin $\theta_3$ and cosine wave data cos $\theta_1$ to cos $\theta_3$ for removing the frequency error of the carrier contained in the in-phase component I and quadrature component Q of the baseband signal input to the complex calculation circuits 2-1 to 2-3 can be generated and the channel having the desired frequency can be acquired.

As described above, in the synchronization acquiring circuit according to the first embodiment of the invention, the frame synchronization pattern 110 contained in the baseband signal can be detected in correspondence with the three frequency ranges representative of different frequency errors. Therefore, if the frequency error generated when ODU down-converts a received radio wave is in a predetermined range (in a range of ±2 MHz), the frame synchronization pattern can be detected quickly.

It is therefore possible to quickly establish a frame synchronization and acquire an RF channel in a short time.

Second Embodiment

A synchronization acquiring circuit according to the second embodiment of the invention will be described.

Figure 8:
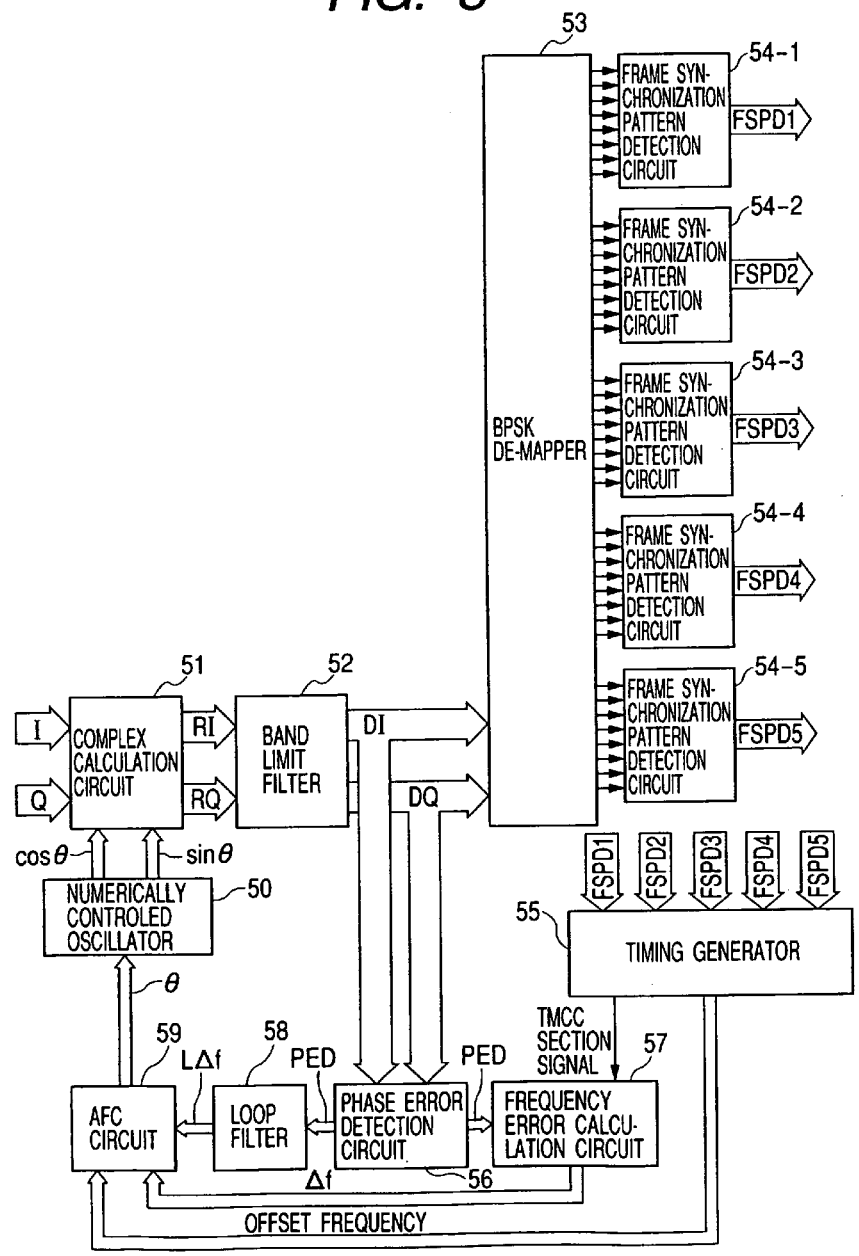
FIG. 8 is a diagram showing the structure of a synchronization acquiring circuit according to a second embodiment of the invention.

FIG. 8 shows the structure of the synchronization acquiring circuit according to the second embodiment of the invention.

As shown in FIG. 8, the synchronization acquiring circuit has a numerically controlled oscillator 50, a complex calculation circuit 51, a band limit filter 52, a BPSK demapper 53, frame synchronization pattern detection circuits 54-1 to 54-5, a timing generator 55, a phase error detection circuit 56, a frequency error calculation circuit 57, a loop filter 58, and an AFC circuit 59.

The numerically controlled oscillator 50 generates sine wave data sin $\theta$ and cosine wave data cos $\theta$ respectively. The numerically controlled oscillator 50 generates a digital signal representative of the amplitude of the sine wave data or cosine wave data corresponding to the phase signal $\theta$ received from the AFC circuit 59, and sends it to the complex calculation circuit 51.

The complex calculation circuit 51 is made of an inverter, a multiplier and the like, and performs calculations for removing the phase error and frequency error of the quantized baseband signal.

More specifically, the complex calculation circuit 51 receives the in-phase component I and quadrature component Q of the baseband signal containing the phase error and frequency error. By using the sine wave data sin $\theta$ and cosine wave data cos $\theta$ received from the numerically controlled oscillator 50, the complex calculation circuit 51 performs a calculation for rotating the phase of the baseband signal to thereby generate an I (in-phase) signal RI and a Q (quadrature) signal RQ.

The complex calculation circuit 51 sends the generated I signal RI and Q signal RQ to the band limit filter 52.

The band limit filter 52 is made of a digital roll-off filter or the like having the raised cosine characteristics, and limits the pass band of the I signal RI and Q signal RQ received from the complex calculation circuit 51 to thereby generate a data waveform having no inter-code interference. The band limit filter 52 sends the band-limited I signal DI and Q signal DQ of the I signal RI and Q signal RQ received from the complex calculation circuit 51, to the BPSK demapper 53.

The band limit filter 52 also sends the band-limited I signal DI and Q signal DQ to the phase error detection circuit 56.

The BPSK demapper 53 recovers the digital signal from the signal point position of the baseband signal in the manner opposite to the BPSK mapping on the transmission side, in order to detect the frame synchronization pattern 110 of 20 symbols transmitted through BPSK modulation.

The BPSK demapper 53 has eight BPSK de-mapping circuits 20 to 27 similar to the synchronization acquiring circuit of the first embodiment.

The BPSK de-mapping circuits 20 to 27 send bit streams B0 to B7 of the recovered digital signals to the frame synchronization pattern detection circuits 54-1 to 54-5.

The frame synchronization pattern detection circuits 54-1 to 54-5 detect frame synchronization patterns from the bit streams B0 to B7 output from the BPSK de-mapping circuits 20 to 27 of the BPSK demapper 53.

Each of the frame synchronization pattern detection circuits 54-1 to 54-5 detects the frame synchronization pattern 110 in the frequency range corresponding to the frequency error contained in the baseband signal.

For example, the frame synchronization pattern detection circuit 54-1 detects the frame synchronization pattern 110 if the frequency error of the baseband signal is in the range from +2.1 MHz to +1.4 MHz.

Similarly the frame synchronization pattern detection circuits 54-2, 54-3, 54-4, and 54-5 detect the frame synchronization pattern 110 if the frequency error is in the ranges from +1.4 MHz to +700 kHz, from +700 kHz to −700 kHz, from −700 kHz to −1.4 MHz, and from −1.4 MHz to −2.1 MHz.

Figure 9:
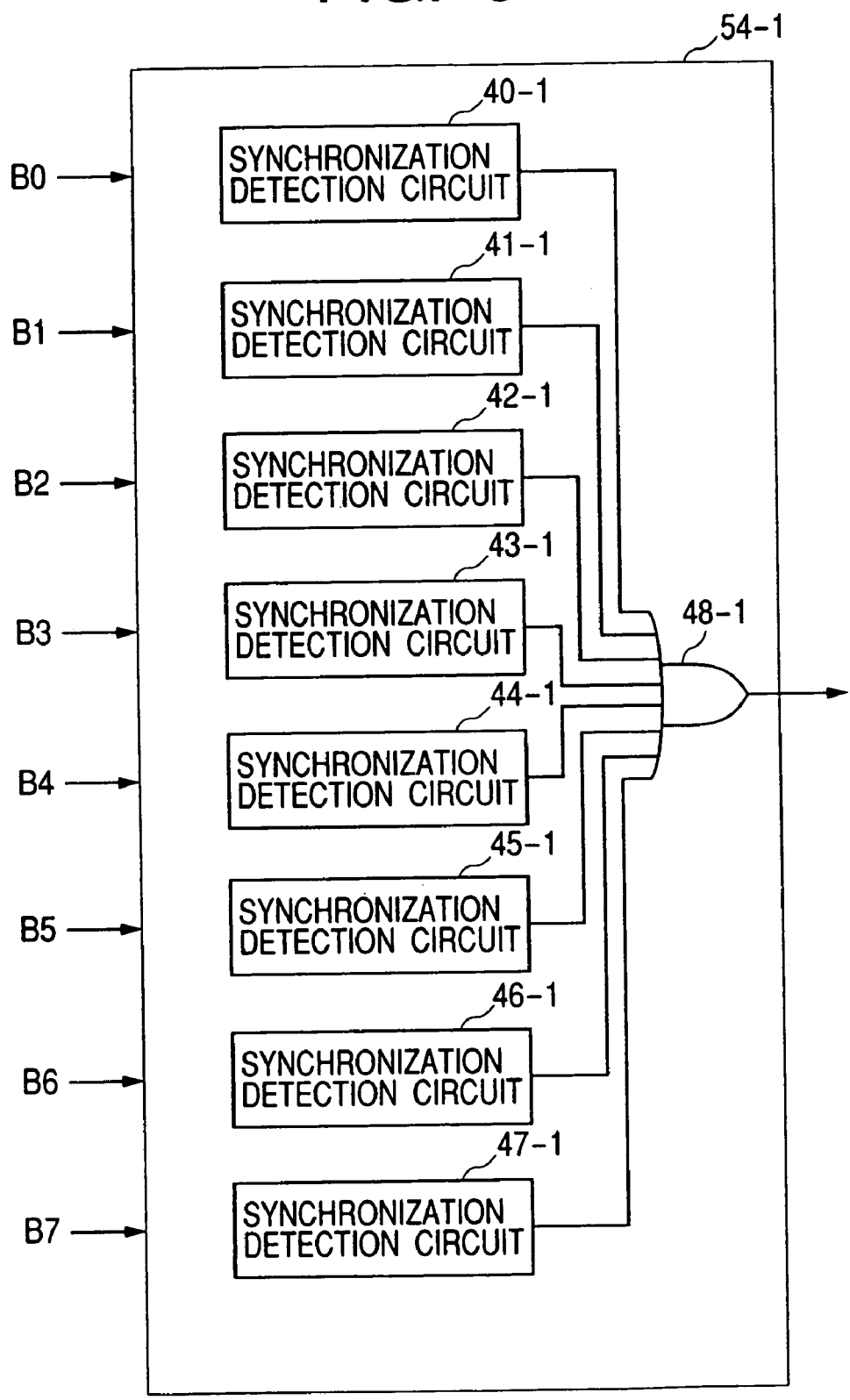
FIG. 9 is a diagram showing the structure of a frame synchronization pattern detection circuit.

The frame synchronization pattern detection circuit 54-1 has eight synchronization detection circuits 40-1 to 47-1 and an OR gate 48-1 as shown in FIG. 9, in order to detect the frame synchronization pattern 110 if the baseband signal received at the complex calculation circuit 51 has a frequency error in the range from +2.1 MHz to +1.4 MHz.

Figure 10:
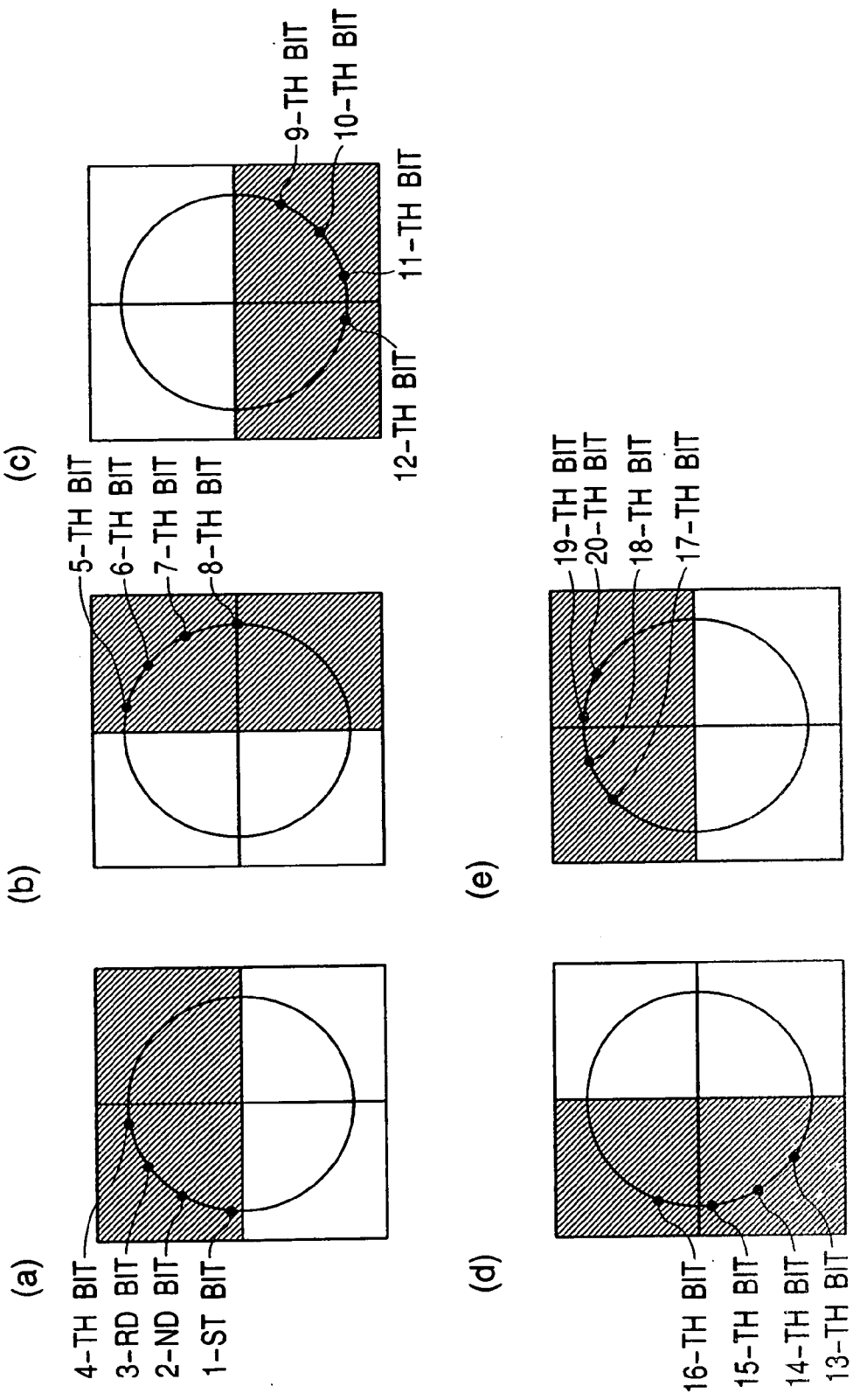
FIG. 10 is a diagram illustrating the positions of signal points by which the synchronization acquiring circuit detects a frame synchronization pattern.

In order to detect the frame synchronization pattern 110 correctly in the case that the frequency error of the baseband signal is in the range from +2.1 MHz to +1.4 MHz, for example, as shown in FIGS. 10(*a*) to 10(*e*), a BPSK decision criterion border line LN on the I-Q vector plane is rotated four times along the same phase direction while 20 symbols of the frame synchronization pattern are received.

The signal point positions shown in FIGS. 10(*a*) to 10(*e*) are assigned to the bit "1" on the transmission side.

The synchronization detection circuits 40-1 to 47-1 of the frame synchronization pattern detection circuit 54-1 detect the frame synchronization pattern 110 by using four of the eight bit streams B0 to B7 received from the eight BPSK de-mapping circuits 20 to 27 of the BPSK demapper 53.

Consider for example the case wherein the synchronization detection circuit 40-1 is used as the circuit for detecting the frame synchronization pattern 110 from the digital signals converted by using the I-Q vector plane whose BPSK decision criterion border line LN is rotated in the order shown in FIGS. 10(*a*) to 10(*e*).

Figure 11:
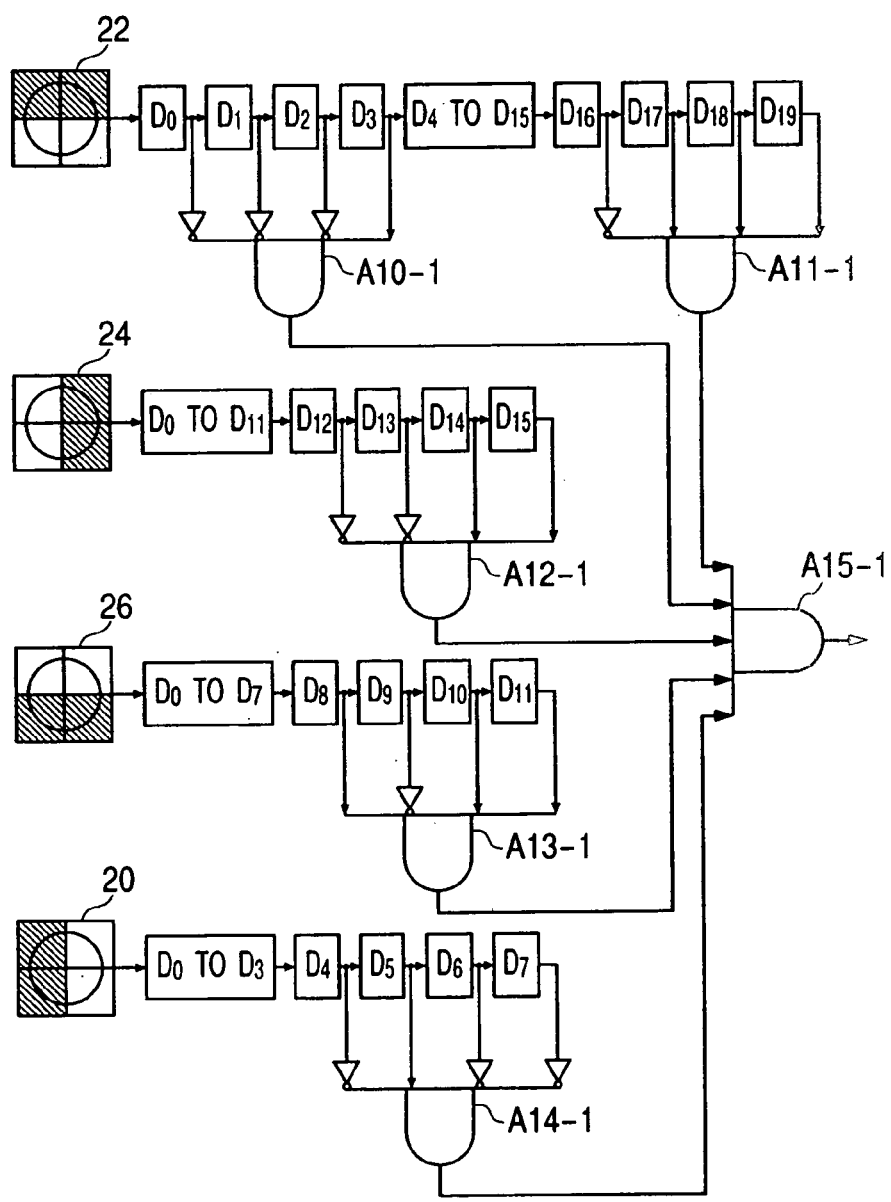
FIG. 11 is a diagram showing a synchronization detector.

In this case, as shown in FIG. 11, the synchronization detection circuit 40-1 has six AND gates A10-1 to A15-1, and delay latches $D_0$ to $D_{19}$ serially connected for respective bit streams.

By using the delay latches $D_0$ to $D_{19}$, this synchronization detection circuit 40-1 delays the bit stream B2 received from the BPSK de-mapping circuit 22 which demaps by using the I-Q vector plane shown in FIG. 4(*c*). The AND gate A10-1 outputs a high level voltage when the state $(D_3D_2D_1D_0)$ of the delay latches $D_0$ to $D_3$) is (1000). The AND gate A11-1 outputs a high level voltage when the state $(D_{19}D_{18}D_{17}D_{16})$ of the delay latches $D_{16}$ to $D_{19}$ is (1110).

By using the delay latches $D_0$ to $D_{15}$, the synchronization detection circuit 40-1 delays the bit stream B4 received from the BPSK de-mapping circuit 24 which demaps by using the I-Q vector plane shown in FIG. 4(*e*). The AND gate A12-1 outputs a high level voltage when the state $(D_{15}D_{14}D_{13}D_{12})$ of the delay latches $D_{12}$ to $D_{15}$) is (1100).

By using the delay latches $D_0$ to $D_{11}$, the synchronization detection circuit 40-1 delays the bit stream B6 received from the BPSK de-mapping circuit 26 which demaps by using the I-Q vector plane shown in FIG. 4(*g*). The AND gate A13-1 outputs a high level voltage when the state $(D_{11}D_{10}D_9D_8)$ of the delay latches $D_8$ to $D_{11}$) is (1101).

By using the delay latches $D_0$ to $D_7$, the synchronization detection circuit 40-1 delays the bit stream B0 received from the BPSK de-mapping circuit 20 which demaps by using the I-Q vector plane shown in FIG. 4(*a*). The AND gate A14-1 outputs a high level voltage when the state $(D_7D_6D_5D_4)$ of the delay latches $D_4$ to $D_7$) is (0010).

The AND gate A15-1 outputs a high level voltage when all the AND gates A10-1 to A14-1 output the high level voltage. Therefore, the synchronization detection circuit 40-1 notifies the timing generator 55 of a detection of a frame synchronization pattern 110 via the OR gate 48-1.

Similar to the synchronization detection circuit 40-1, the synchronization detection circuits 41-1 to 47-1 shown in FIG. 9 detect the frame synchronization pattern 110 by using four of the bit streams B0 to B7 received from the eight BPSK de-mapping circuits 20 to 27 of the BPSK demapper 53.

The synchronization detection circuits 40-1 to 47-1 are structured so that they can deal with different reception point phase rotation angles by 45°×n (n is an integer of 0 to 7) at the time when the first bits of the frame synchronization pattern 110 are received.

The synchronization detection circuits 40-1 to 47-1 may share the delay latches $D_0$ to $D_{19}$ for delaying each of the bit streams B0 to B7. In this case, the connection wiring is formed in accordance with the state of the delay latches $D_0$ to $D_{19}$ for obtaining the logical products.

Figure 12:
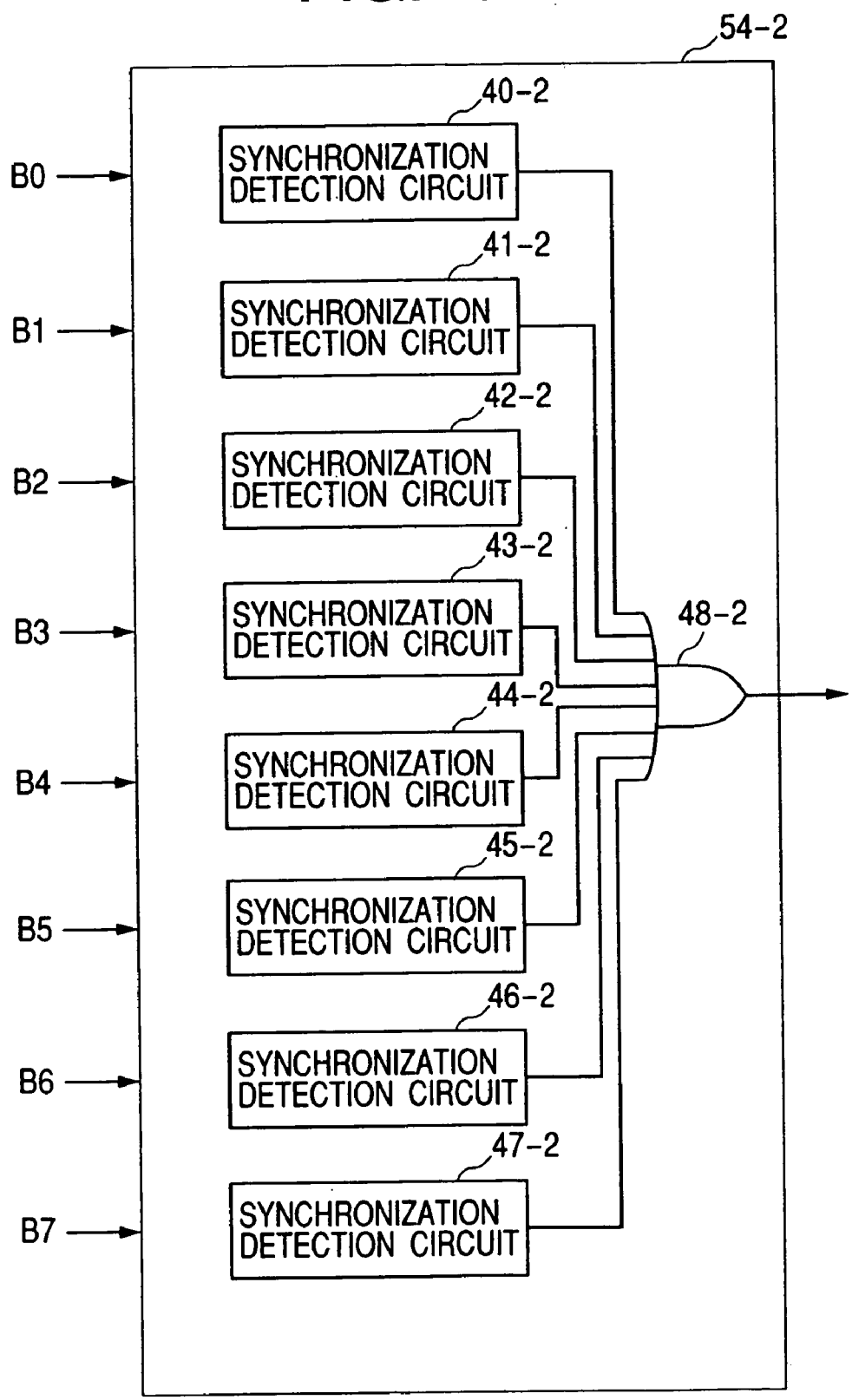
FIG. 12 is a diagram showing the structure of a frame synchronization pattern detection circuit.

The frame synchronization pattern detection circuit 54-2 shown in FIG. 8 has eight synchronization detection circuits 40-2 to 47-2 and an OR gate 48-2 as shown in FIG. 12, in order to detect the frame synchronization pattern 110 if the baseband signal received at the complex calculation circuit 51 has a frequency error in the range from +1.4 MHz to +700 kHz.

Figure 13:
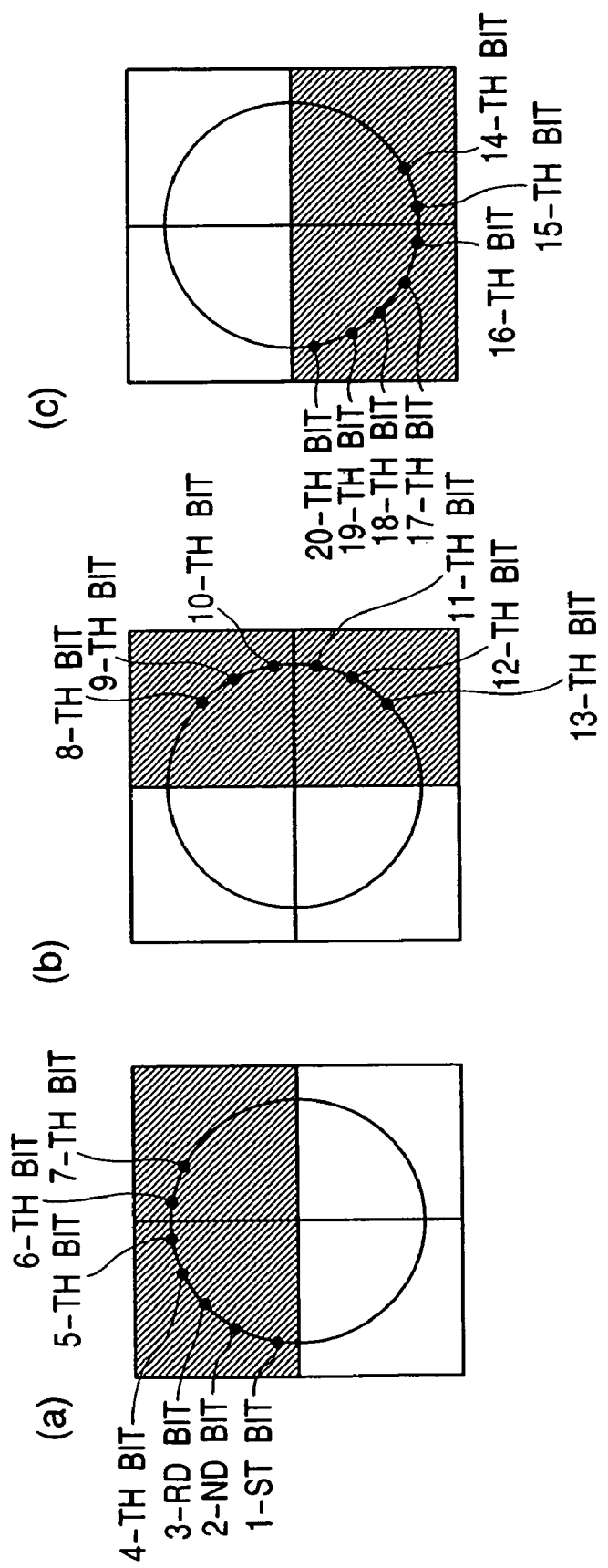
FIG. 13 is a diagram showing the positions of signal points by which the synchronization detector detects a frame synchronization pattern.

In order to detect the frame synchronization pattern 110 correctly in the case that the frequency error of the baseband signal is in the range from +1.4 MHz to +700 kHz, for example, as shown in FIGS. 13(*a*) to 13(*c*), the BPSK decision criterion border line LN on the I-Q vector plane is rotated twice along the same phase direction while 20 symbols of the frame synchronization pattern are received.

The signal point positions shown in FIGS. 13(*a*) to 13(*c*) are assigned to the bit "1" on the transmission side.

The synchronization detection circuits 40-2 to 47-2 of the frame synchronization pattern detection circuit 54-2 detect the frame synchronization pattern 110 by using three of the eight bit streams B0 to B7 received from the eight BPSK de-mapping circuits 20 to 27 of the BPSK demapper 53.

Consider for example the case wherein the synchronization detection circuit 40-2 is used as the circuit for detecting the frame synchronization pattern 110 from the digital signals converted by using the I-Q vector plane whose BPSK decision criterion border line LN is rotated in the order shown in FIGS. 13(*a*) to 13(*c*).

Figure 14:
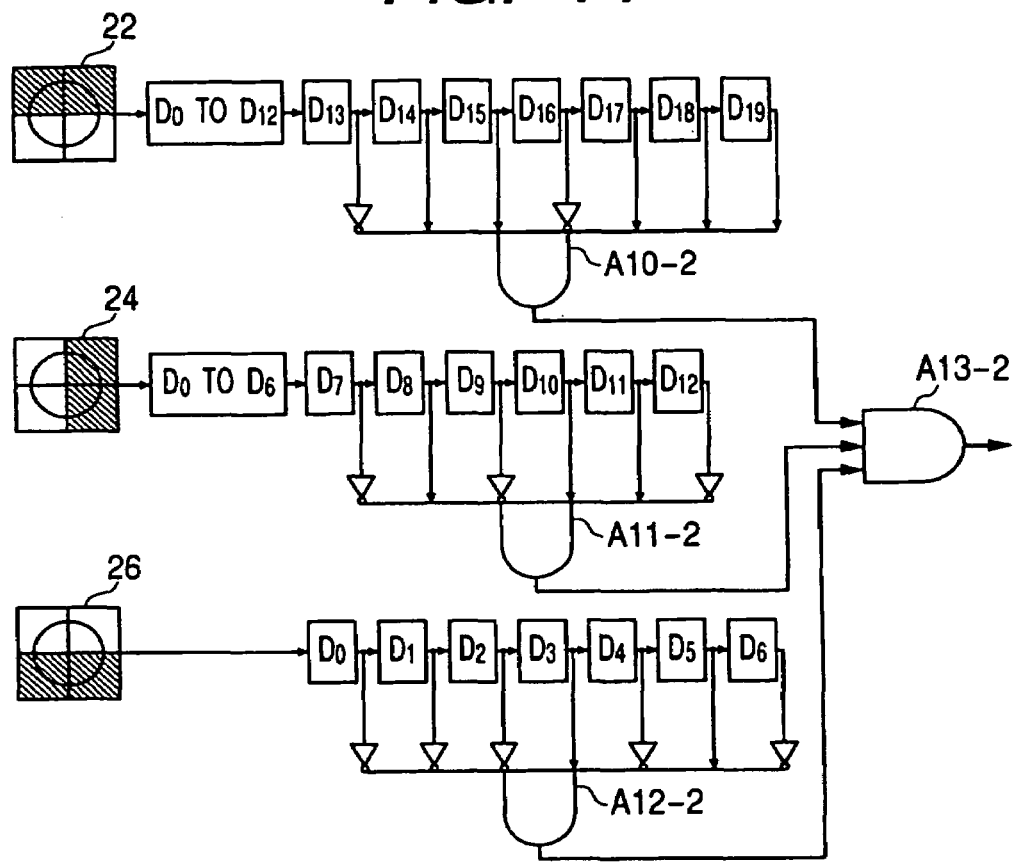
FIG. 14 is a diagram showing the structure of the synchronization detector.
Figure 15:
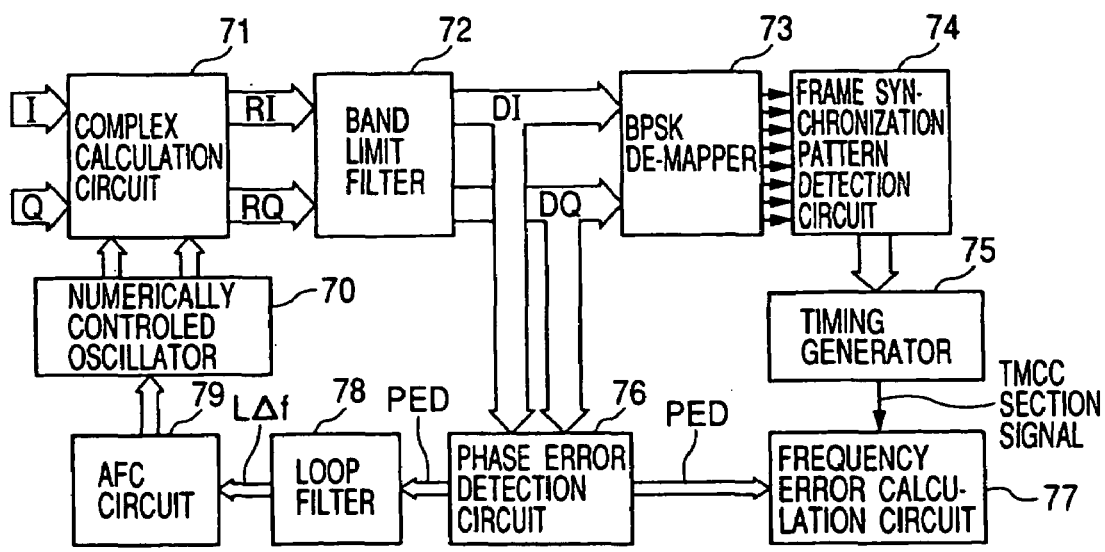
FIG. 15 is a diagram showing the structure of a conventional synchronization acquiring circuit.
Figure 16:
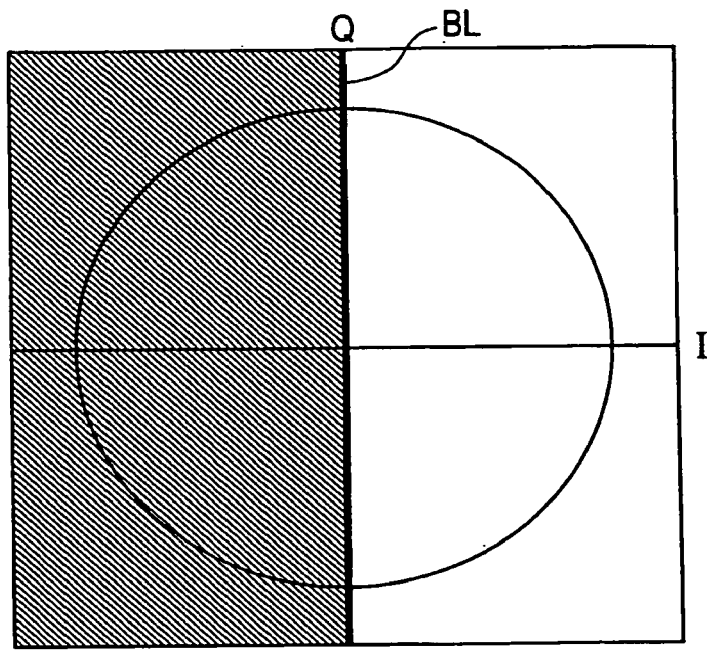
FIG. 16 is a diagram showing an I-Q vector plane used by a BPSK demapper.
Figure 17:
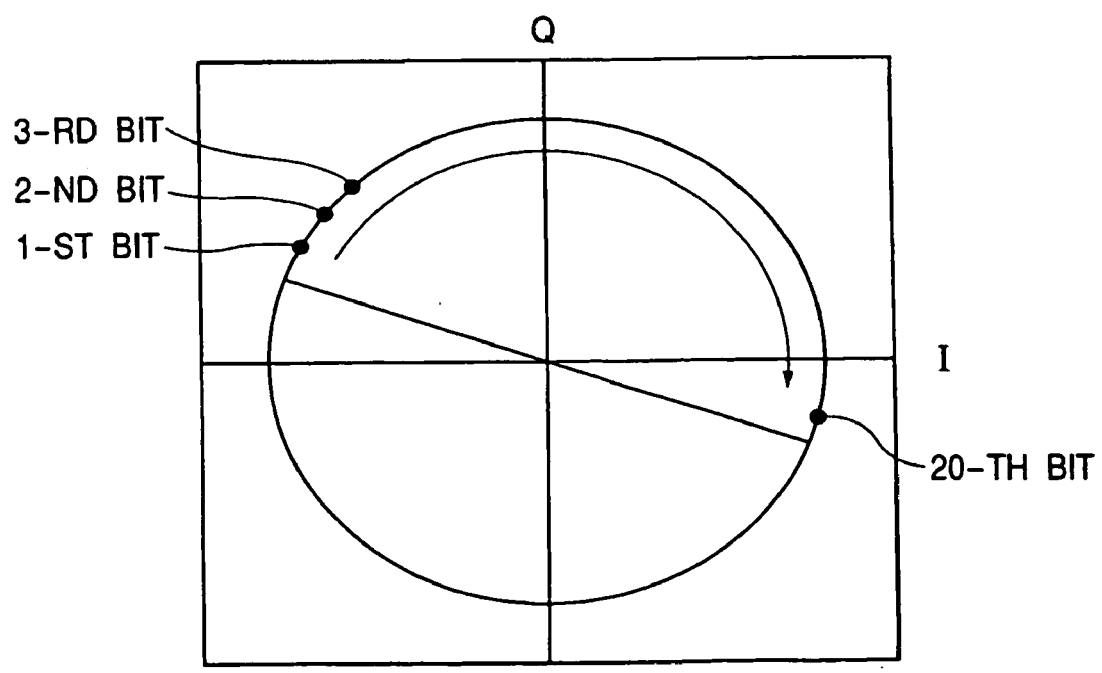
FIG. 17 is a diagram illustrating a motion of signal points to be caused by a frequency error.

In this case, as shown in FIG. 14, the synchronization detection circuit 40-2 has four gates A10-2 to A13-2, and delay latches $D_0$ to $D_{19}$ serially connected for respective bit streams.

By using the delay latches $D_0$ to $D_{19}$ this synchronization detection circuit 40-2 delays the bit stream B2 received from the BPSK de-mapping circuit 22 which demaps by using the I-Q vector plane shown in FIG. 4(*c*). The AND gate A10-2 outputs a high level voltage when the state $(D_{19}D_{18}D_{17}D_{16}D_{15}D_{14}D_{13})$ of the delay latches $D_{13}$ to $D_{19}$) is (1110110).

By using the delay latches $D_0$ to $D_{12}$, the synchronization detection circuit 40-2 delays the bit stream B4 received from the BPSK de-mapping circuit 24 which demaps by using the I-Q vector plane shown in FIG. 4(*e*). The AND gate A11-2 outputs a high level voltage when the state $(D_{12}D_{11}D_{10}D_9D_8D_7)$ of the delay latches $D_7$ to $D_{12}$) is (011010).

By using the delay latches $D_0$ to $D_6$, the synchronization detection circuit 40-2 delays the bit stream B6 received from the BPSK de-mapping circuit 26 which demaps by using the I-Q vector plane shown in FIG. 4(*g*). The AND gate A12-2 outputs a high level voltage when the state $(D_6D_5D_4D_3D_2D_1D_0)$ of the delay latches $D_0$ to $D_6$) is (0101000).

The AND gate A13-2 outputs a high level voltage when all the AND gates A10-2 to A12-2 output the high level voltage. Therefore, the synchronization detection circuit 40-2 notifies the timing generator 55 of a detection of a frame synchronization pattern 110 via the OR gate 48-2.

Similar to the synchronization detection circuit 40-2, the synchronization detection circuits 41-2 to 47-2 shown in FIG. 12 detect the frame synchronization pattern 110 by using three of the bit streams B0 to B7 received from the eight BPSK de-mapping circuits 20 to 27 of the BPSK demapper 53.

The synchronization detection circuits 40-2 to 47-2 are structured so that they can deal with different reception point phase rotation angles by 45°×n (n is an integer of 0 to 7) at the time when the first bits of the frame synchronization pattern 110 are received.

The synchronization detection circuits 40-2 to 47-2 may share the delay latches $D_0$ to $D_{19}$ for delaying each of the bit streams B0 to B7. In this case, the connection wiring is formed in accordance with the states of the delay latches $D_0$ to $D_{19}$ for obtaining the logical products.

The frame synchronization pattern detection circuit 54-3 shown in FIG. 8 detects the frame synchronization pattern 110 if the baseband signal received at the complex calculation circuit 51 has a frequency error in the range from +700 kHz to −700 kHz, and has the same structure as that of the frame synchronization pattern detection circuits 5-1 to 5-3 of the first embodiment.

The frame synchronization pattern detection circuit 54-4 detects the frame synchronization pattern 110 if the baseband signal received at the complex calculation circuit 51 has a frequency error in the range from −700 kHz to −1.4 MHz. This frame synchronization pattern detection circuit 54-4 is structured in order to recover the digital signal by rotating the BPSK decision criterion border line LN twice in the phase direction opposite to that of the frame synchronization detection circuit 54-2 while the symbols of the frame synchronization pattern 13 are received.

The frame synchronization pattern detection circuit 54-5 detects the frame synchronization pattern 110 if the baseband signal received at the complex calculation circuit 51 has a frequency error in the range from −1.4 MHz to −2.1 MHz. This frame synchronization pattern detection circuit 54-5 is structured in order to recover the digital signal by rotating the BPSK decision criterion border line LN four times in the phase direction opposite to that of the frame synchronization detection circuit 54-2 while the symbols of the frame synchronization pattern 13 are received.

The timing generator 55 establishes a frame synchronization when it is notified from the frame synchronization pattern detection circuits 54-1 to 54-5 that the frame synchronization pattern 110 was detected.

After the timing generator 55 establishes the frame synchronization, it derives the TMCC data 111 to identify the frame multiplex configuration, and sends a TMCC section signal to the frequency error calculation circuit 57 to specify the TMCC section.

When the timing generator 55 receives a notice of a detection of the frame synchronization pattern 110 from one of the frame synchronization pattern detection circuits 54-1 to 54-5, it decides which one of the frame synchronization pattern detection circuits 54-1 to 54-5 detected the frame synchronization pattern. In accordance with this decision result, the timing generator 55 notifies the AFC circuit 59 of an off-set frequency for acquiring an RF channel.

In accordance with the I signal DI and W signal DQ received from the band limit filter 52, the phase error detection circuit 56 specifies the signal point position on the I-Q vector plane to obtain a phase error (received signal phase rotation angle) between the phase of the signal point position and the absolute phase.

The phase error detection circuit 56 generates a phase error signal PED corresponding to the obtained phase error, and sends it to the frequency error calculation circuit 57 and loop filter 58.

The frequency error calculation circuit 57 specifies the TMCC section from the TMCC section signal received from the timing generator 55, and calculates a difference (error frequency) Δf between a desired frequency and the frequency of the recovered carrier, in accordance with the phase error in the TMCC section represented by the phase error signal PED received from the phase error detection circuit 56.

The frequency error calculation circuit 57 notifies the calculated error frequency Δf to the AFC circuit 59.

The loop filter 58 is a low pass filter for smoothing the phase error signal PED received from the phase error detection circuit 56, and supplies the smoothed phase error signal PED to the AFC circuit 59 as a phase adjustment signal LΔf.

The AFC circuit 59 is used for generating a phase signal θ corresponding to the error frequency Δf supplied from the frequency error calculation circuit 57 and the phase adjustment signal LΔf supplied from the loop filter 58, so as to recover the carrier.

The AFC circuit 59 controls the numerically controlled oscillator 50 by the phase signal corresponding to the off-set frequency notified from the timing generator 55, to thereby make the numerically controlled oscillator 50 generate the sine wave data sin and cosine wave data cos which allow the frame synchronization pattern detection circuit 54-3 to detect the frame synchronization patten 110.

Next, the operation of the synchronization acquiring circuit according to the second embodiment of the invention will be described.

In the synchronization acquiring circuit of the second embodiment of the invention, the numerically controlled oscillator 50, complex calculation circuit 51, band limit filter 52, phase error detection circuit 56, frequency error calculation circuit 57, loop filter 58 and AFC circuit 59 constitute a carrier reproduction loop which removes the frequency error of the carrier contained in the in-phase component I and quadrature component Q of the baseband signal input to the complex calculation circuit 51.

The numerically controlled oscillator 50, complex calculation circuit 51 and band limit filter 52 operate in the manner similar to the numerically controlled oscillators 1-1 to 1-3, complex calculation circuits 2-1 to 2-3 and band limit filters 3-1 to 3-3 of the synchronization acquiring circuit of the first embodiment.

If the baseband signal received at the complex calculation circuit 51 contains no frequency error (frequency error of 0 Hz), the AFC circuit 59 performs a complex number calculation of the phase signal to set it to such a value that the phase of the signal point assigned a predetermined signal (0 or 1) on the transmission side will not rotate on the reception side.

The I signal DI and Q signal DQ output from the band limit filter 52 are input to the BPSK demapper 53 and phase error detection circuit 56.

The BPSK de-mapping circuits 20 to 27 of the BPSK demapper 53 recover digital signals and send them to the frame synchronization pattern detection circuits 54-1 to 54-5.

The frame synchronization pattern detection circuits 54-1 to 54-5 detect the frame synchronization pattern 110 in the different ranges of a frequency error of the baseband signal.

Namely, the frame synchronization detection circuit 54-1 detects the frame synchronization pattern 110 if the frequency error of the baseband received at the complex calculation circuit 51 is in the range from +2.1 MHz to +1.4 MHz.

Similarly, the frame synchronization detection circuits 54-2 to 54-5 detect the frame synchronization pattern 110, respectively in the frequency error ranges from +1.4 MHz to +700 kHz, from +700 kHz to −700 kHz, from −700 kHz to −1.4 MHz, and from −1.4 MHz to −2.1 MHz.

The frame synchronization pattern detection circuit 54-3 can detect the frame synchronization pattern 110, if the center frequency in the frequency band assigned to an RF channel is down-converted by ODU (not shown) so as to correspond to the frequency of the intermediate frequency signal (BS-IF signal) in the predetermined frequency range including the oscillation frequency of the local oscillator (not shown).

The frame synchronization pattern detection circuit 54-2 can detect the frame synchronization pattern 110, if the center frequency in the frequency band assigned to an RF channel is down-converted by ODU (not shown) so as to correspond to the frequency of the intermediate frequency signal (BS-IF signal) in the predetermined frequency range higher than the frequency range in which the frame synchronization pattern detection circuit 54-3 can detect the frame synchronization pattern 110.

The frame synchronization pattern detection circuit 54-1 can detect the frame synchronization pattern 110, if the center frequency in the frequency band assigned to an RF channel is down-converted by ODU (not shown) so as to correspond to the frequency of the intermediate frequency signal (BS-IF signal) in the predetermined frequency range higher than the frequency range in which the frame synchronization pattern detection circuit 54-2 can detect the frame synchronization pattern 110.

The frame synchronization pattern detection circuit 54-4 can detect the frame synchronization pattern 110, if the center frequency in the frequency band assigned to an RF channel is down-converted by ODU (not shown) so as to correspond to the frequency of the intermediate frequency signal (BS-IF signal) in the predetermined frequency range lower than the frequency range in which the frame synchronization pattern detection circuit 54-3 can detect the frame synchronization pattern 110.

The frame synchronization pattern detection circuit 54-5 can detect the frame synchronization pattern 110, if the center frequency in the frequency band assigned to an RF channel is down-converted by ODU (not shown) so as to correspond to the frequency of the intermediate frequency signal (BS-IF signal) in the predetermined frequency range lower than the frequency range in which the frame synchronization pattern detection circuit 54-4 can detect the frame synchronization pattern 110.

When the frame synchronization detection circuits 54-1 to 54-5 detect the frame synchronization pattern 110, it notifies this effect to the timing generator 55.

When the timing generator 55 is notified from one of the frame synchronization pattern detection circuits 54-1 to 54-5 that the frame synchronization pattern 110 was detected, in response to this notice, the timing generator 55 establishes the frame synchronization, generates a TMCC section signal for specifying the TMCC section, and sends it to the frequency error calculation circuit 57.

In this case, the timing generator 55 decides which one of the frame synchronization pattern detection circuits 54-1 to 54-5 detected the frame synchronization pattern 110, and in accordance with this decision result, the timing generator 55 notifies the AFC circuit 59 of the off-set frequency for acquiring the RF channel.

More specifically, if the timing generator 55 decides that the frame synchronization pattern detection circuit 54-1 detected the frame synchronization pattern 110, the timing generator 55 notifies the AFC circuit 59 of the off-set frequency of +1.75 MHz.

If the timing generator 55 decides that the frame synchronization pattern detection circuit 54-2 detected the frame synchronization pattern 110, the timing generator 55 notifies the AFC circuit 59 of the off-set frequency of +1.05 MHz.

If the timing generator 55 decides that the frame synchronization pattern detection circuit 54-3 detected the frame synchronization pattern 110, the timing generator 55 notifies the AFC circuit 59 of the off-set frequency of 0 MHz.

If the timing generator 55 decides that the frame synchronization pattern detection circuit 544 detected the frame synchronization pattern 110, the timing generator 55 notifies the AFC circuit 59 of the off-set frequency of −1.05 MHz.

If the timing generator 55 decides that the frame synchronization pattern detection circuit 54-5 detected the frame synchronization pattern 110, the timing generator 55 notifies the AFC circuit 59 of the off-set frequency of −1.75 MHz.

The AFC circuit 59 controls the numerically controlled oscillator 50 by the phase signal corresponding to the off-set frequency notified from the timing generator 55 to generate the sine wave data sin and cosine data cos.

By using the sine wave data sin and cosine data cos defined by the phase signal corresponding to the off-set frequency, the complex calculation circuit 51 removes the frequency error contained in the in-phase component I and quadrature component Q of the baseband signal.

In this manner, if the frequency error of an RF channel to be acquired is outside the range of ±700 kHz, the frequency error is inside the range of ±35 kHz.

Therefore, when one of the frame synchronization pattern detection circuits 54-1 to 54-5 detects the frame synchronization pattern 110, the complex calculation circuit 51 changes the frequency of the baseband signal so that the frame synchronization pattern detection circuit 54-3 can detect the frame synchronization pattern.

Since the band to be covered by the frame synchronization pattern detection circuit 54-3 is as broad as 1.4 4 MHz, the RF channel can be stably acquired.

Thereafter, in accordance with the I signal DI and Q signal DQ received from the band limit filter 52, the phase error detection circuit 56 specifies the signal point position on the I-Q vector plane and obtains the phase error (received signal phase rotation angle) between the phase of the signal point position and the absolute phase.

The phase error detection circuit 56 generates the phase error signal PED corresponding to the obtained phase error, and sends it to the frequency error calculation circuit 57 and loop filter 58.

The frequency error calculation circuit 57 specifies the TMCC section from the TMCC section signal received from the timing generator 55, and calculates a difference (error frequency) $\Delta f$ between the desired frequency and the frequency of the recovered carrier by using the phase error in the TMCC section indicated by the phase error signal PED received from the phase error detection circuit 56.

The frequency error calculation circuit 57 notifies the calculated error frequency $\Delta f$ to the AFC circuit 59.

The loop filter 58 smoothes the phase error signal PED received from the phase error detection circuit 56 to obtain a phase adjustment signal LΔf which is sent to the AFC circuit 59.

The AFC circuit 59 adjusts the phase signal in accordance with the error frequency ΔF notified from the frequency error calculation circuit 57 and the phase adjustment signal LΔf received from the loop filter 58 to control the numerically controlled oscillator 50 and recover the carrier.

In this manner, the sine wave data sin and cosine wave data cos for removing the frequency error of the carrier contained in the in-phase component I and quadrature component Q of the baseband signal input to the complex calculation circuit 51 can be generated and the channel having the desired frequency can be acquired.

As described above, in the synchronization acquiring circuit according to the second embodiment of the invention, the frame synchronization pattern detection circuits 54-1 to 54-5 are provided for detecting the frame synchronization pattern 110 in correspondence with the five frequency ranges representative of different frequency errors contained in the baseband signal. Therefore, even if the baseband signal has a large frequency error, the frame synchronization pattern can be detected instantly. If the frequency error generated when ODU down-converts is in the predetermined range (in the range of ±2 MHz), the frame synchronization pattern 110 can be detected at once.

When one of the frame synchronization pattern detection circuits 54-1 to 54-5 detects the frame synchronization pattern 110, the off-set frequency is set so that the frame synchronization pattern detection circuit 54-3 capable of detecting the frame synchronization pattern in the broadest range of the frequency error, can establish the frame synchronization.

It is therefore possible to quickly establish a frame synchronization and acquire an RF channel in a short time and stably.

The present invention is not limited only to receiving BS digital broadcasting, but is applicable to any receiver which receives the baseband signal containing a frequency error and establishes a frame synchronization.

INDUSTRIAL APPLICABILITY

As described so far, according to the present invention, the frame synchronization pattern is detected in correspondence with the frequency ranges representative of different frequency errors contained in the baseband signal, so that the frame synchronization can be established quickly and an RF channel can be acquired in a short time.

What is claimed is:

1. A synchronization acquiring circuit for receiving a baseband signal transferred as an intermediate frequency signal obtained by down-converting a received radio wave and for acquiring a radio frequency channel, comprising:
 a plurality of pattern detection means disposed in parallel each performing an operation of receiving the baseband signal transferred by the intermediate frequency signal in a different frequency range and detecting a predetermined frame synchronization pattern; and
 carrier recovery means for establishing a frame synchronization and recovering a carrier to be used for removing a frequency error of the baseband signal when one of said plurality of pattern detection means detects the frame synchronization pattern.

2. A synchronization acquiring circuit for receiving a baseband signal transferred as an intermediate frequency signal obtained by down-converting a received radio wave and for acquiring a radio frequency channel, comprising:
 first pattern detection means for receiving the baseband signal transferred by the intermediate frequency signal in a predetermined frequency range and detecting a predetermined frame synchronization pattern;
 second pattern detection means for receiving baseband signal transferred by the intermediate frequency signal in a frequency range higher than the frequency range of the intermediate frequency signal transferring the baseband signal from which said first pattern detection means can detect the frame synchronization pattern, and detecting the predetermined frame synchronization pattern;
 third pattern detection means for receiving the baseband signal transferred by the intermediate frequency signal in a frequency range lower than the frequency range of the intermediate frequency signal transferring the baseband signal from which said first pattern detection means can detect the frame synchronization pattern, and detecting the predetermined frame synchronization pattern; and
 carrier recovery means for establishing a frame synchronization and recovering a carrier to be used for removing a frequency error of the baseband signal when one of said first to third pattern detection means detects the frame synchronization pattern.

3. A synchronization acquiring circuit according to claim 2, wherein each of said first to third pattern detection means comprises:
 signal conversion means for specifying a phase of the received baseband signal and converting the phase into a digital signal corresponding to the specified phase; and
 signal decision means for deciding whether the digital signal generated through conversion by said signal conversion means contains the predetermined frame synchronization pattern.

4. A synchronization acquiring circuit according to claim 3, wherein:
 said signal conversion means has:
 eight de-mapping means each for specifying the phase of the baseband signal on a phase plane having a decision criterion border line whose phase is rotated by =45°×n (where n is an integer of 0 to 7) and obtaining the converted digital signal, the decision criterion border line being used for specifying a value of the converted digital signal corresponding to the specified phase of the baseband signal; and
 said signal decision means has:
 eight sequence decision means for deciding whether each digital signal sequence generated through conversion by each of said eight de-mapping means contains the predetermined frame synchronization pattern; and
 means for notifying said carrier recovery means of that the frame synchronization pattern was detected, if at least one of said eight sequence decision means decides that the digital signal sequence contains the predetermined frame synchronization pattern.

5. A synchronization acquiring circuit according to any one of claims 2, 3 and 4, wherein:
 each of said first to third pattern detection means comprises:
 waveform data making means for creating waveform data to be used for rotating a phase of the baseband signal; and complex calculation means for rotating the phase of the baseband signal by executing a complex number calculation between the waveform data created by said waveform making means and the received baseband signal; and said carrier recovery means comprises:

identification means for identifying one of said first to third pattern detection means which detected the frame synchronization pattern;

signal selection means for selecting the baseband signal whose phase was rotated by said complex calculation means of one of said first to third pattern detection means identified by said identification means;

phase error identification means for identifying a phase error by comparing the phase of the baseband signal selected by said signal selection means and an absolute phase;

frequency error identification means for identifying a frequency error contained in the baseband signal in accordance with the phase error identified by said phase error identification means; and carrier recovery means for recovering a carrier to be used for removing the phase error and frequency error contained in the baseband signal, by controlling said waveform data making means of one of said first to third pattern detection means identified by said identification means in accordance with the phase error identified by said phase error identification means and the frequency error identified by said frequency error identification means.

6. A synchronization acquiring circuit for receiving a baseband signal transferred as an intermediate frequency signal obtained through frequency conversion of a received radio wave and for acquiring a radio frequency channel of BS digital broadcasting, the circuit comprising:

a plurality of frame synchronization pattern detecting means (e.g., 54-1~54-5) for receiving the baseband signal which contains a frequency error corresponding to a whole frequency range of the intermediate frequency signal, to detect a frame synchronization pattern through conversion into a digital signal and in correspondence with the frequency error, wherein different ones of the plurality of synchronization pattern detecting means correspond to different ranges of frequency error, respectively; and wherein a carrier synchronized with a frequency of the baseband signal is recovered on the basis of a range of frequency error contained in the baseband signal from which the frame synchronization pattern was detected by any of the plurality of detecting means, to thereafter establish a frame synchronization.

7. A synchronization acquiring circuit for receiving a baseband signal transferred as an intermediate frequency signal obtained by down-converting a received radio wave and for acquiring a radio frequency channel, comprising:

signal conversion means for identifying a phase of a received baseband signal phase-modulated in a symbol unit and converting the baseband signal into a digital signal corresponding to the identified phase;

a plurality of pattern detection means disposed in parallel for detecting a predetermined frame synchronization pattern transferred by the baseband signal, in accordance with the digital signal generated through conversion by said signal conversion means, each of said plurality of pattern detection means being related to a frequency of the intermediate frequency signal in a different frequency range; and frequency control means for changing the frequency of the baseband signal by using an off-set frequency corresponding to a frequency error contained in the baseband signal, when one of said plurality of pattern detection means detects the frame synchronization pattern, and for establishing a frame synchronization after said signal conversion means identifies the phase of the baseband signal.

8. A synchronization acquiring circuit for receiving a baseband signal transferred as an intermediate frequency signal obtained by down-converting a received radio wave and for acquiring a radio frequency channel, comprising:

first pattern detection means for detecting a predetermined frame synchronization pattern transferred by the baseband signal, in accordance with the digital signal generated through conversion by said signal conversion means, if a center frequency of a range assigned to the radio frequency channel corresponds to a frequency of the intermediate frequency signal in a predetermined frequency range;

second pattern detection means for detecting the predetermined frame synchronization pattern transferred by the baseband signal, in accordance with the digital signal generated through conversion by said signal conversion means, if the center frequency of the range assigned to the radio frequency channel corresponds to the frequency of the intermediate frequency signal in a frequency range higher than the frequency range of the intermediate frequency signal from which said first pattern detection means can detect the frame synchronization pattern;

third pattern detection means for detecting the predetermined frame synchronization pattern transferred by the baseband signal, in accordance with the digital signal generated through conversion by said signal conversion means, if the center frequency of the range assigned to the radio frequency channel corresponds to the frequency of the intermediate frequency signal in a frequency range higher than the frequency range of the intermediate frequency signal from which said second pattern detection means can detect the frame synchronization pattern;

fourth pattern detection means for detecting the predetermined frame synchronization pattern transferred by the baseband signal, in accordance with the digital signal generated through conversion by said signal conversion means, if the center frequency of the range assigned to the radio frequency channel corresponds to the frequency of the intermediate frequency signal in a frequency range lower than the frequency range of the intermediate frequency signal from which said first pattern detection means can detect the frame synchronization pattern;

fifth pattern detection means for detecting the predetermined frame synchronization pattern transferred by the baseband signal, in accordance with the digital signal generated through conversion by said signal conversion means, if the center frequency of the range assigned to the radio frequency channel corresponds to the frequency of the intermediate frequency signal in a frequency range lower than the frequency range of the intermediate frequency signal from which said first to fourth detection means can detect the frame synchronization pattern; and frequency control means for transforming the frequency of the baseband signal by using an off-set frequency corresponding to a frequency error contained in the baseband signal, when one of said first to fifth pattern detection means detects the frame synchronization pattern, for making said signal conversion means identify a phase of the baseband signal, and for making said first pattern detection means detect the frame synchronization pattern to thereafter establish a frame synchronization.

9. A synchronization acquiring circuit according to claim 8, wherein:

said signal conversion means has:

eight de-mapping means each for specifying the phase of the baseband signal on a phase plane having a decision criterion border line whose phase is rotated by =45°×n (where n is an integer of 0 to 7) and obtaining the converted digital signal, the decision criterion border line being used for specifying a value of the converted digital signal corresponding to the specified phase of the baseband signal;

said first pattern detection means has:

eight sequence decision means each for deciding whether each digital signal sequence generated through conversion by each of said eight de-mapping means contains the predetermined frame synchronization pattern; and means for notifying said frequency control means of that the frame synchronization pattern was detected, if at least one of said eight sequence decision means decides that the frame synchronization pattern is contained;

said second and fourth pattern detection means have each:

eight first rotation sequence decision means for deciding whether the predetermined frame synchronization pattern is contained, by using three of eight digital sequences generated through conversion by said eight de-mapping means; and said third and fifth pattern detection means have each:

eight second rotation sequence decision means for deciding whether the predetermined frame synchronization pattern is contained, by using four of eight digital sequences generated through conversion by said eight de-mapping means.

10. A synchronization acquiring circuit according to claim 9, wherein said first and second rotation sequence decision means each have:

delay means for delaying each bit of the digital signal sequence; and means for deciding whether the predetermined frame synchronization pattern is contained, by deriving the digital signal sequence from said delay means in a manner that the phase of the decision criterion border line rotates in the same direction as a signal reception time lapses.

11. A synchronization acquiring circuit according to claim 10, wherein:

said first rotation sequence decision means of said second pattern detection means and said first rotation sequence decision means of said fourth pattern detection means derive the digital signal sequence from said delay means in a manner that the phase of the decision criterion border lines rotate in opposite directions as a signal reception time lapses; and said second rotation sequence decision means of said third pattern detection means and said second rotation sequence decision means of said fifth pattern detection means derive the digital signal sequence from said delay means in a manner that the phase of the decision criterion border lines rotate in opposite directions as a signal reception time lapses.

12. A synchronization acquiring circuit according to any one of claims 7 to 11, wherein said frequency control means comprises:

waveform data making means for creating waveform data to be used for rotating a phase of the baseband signal;

complex calculation means for rotating the phase of the baseband signal by executing a complex number calculation between the waveform data created by said waveform making means and the received baseband signal;

phase error identification means for identifying a phase error by comparing the phase of the baseband signal rotated by said complex calculation means and an absolute phase;

frequency error identification means for identifying a frequency error contained in the baseband signal in accordance with the phase error identified by said phase error identification means; and carrier recovery means for recovering a carrier to be used for removing the phase error and frequency error contained in the baseband signal, by controlling said waveform data making means in accordance with the phase error identified by said phase error identification means and the frequency error identified by said frequency error identification means.

13. A synchronization acquiring method of receiving a baseband signal transferred as an intermediate frequency signal obtained by down-converting a received radio wave and for acquiring a radio frequency channel, comprising:

a first pattern detection step of receiving the baseband signal transferred by the intermediate frequency signal in a predetermined frequency range and detecting a predetermined frame synchronization pattern;

a second pattern detection step of receiving, at the same time as said first pattern detection step, the baseband signal transferred by the intermediate frequency signal in a frequency range higher than the frequency range of the intermediate frequency signal transferring the baseband signal from which said first pattern detection step can detect the frame synchronization pattern, and detecting the predetermined frame synchronization pattern;

a third detection step of receiving, at the same time as said first and second pattern detection steps, the baseband signal transferred by the intermediate frequency signal in a frequency range lower than the frequency range of the intermediate frequency signal transferring the baseband signal from which said first pattern detection step can detect the frame synchronization pattern, and detecting the predetermined frame synchronization pattern; and a carrier recovery step of establishing a frame synchronization and recovering a carrier to be used for removing a frequency error of the baseband signal when one of said first to third pattern detection steps detects the frame synchronization pattern.

* * * * *